United States Patent [19]
Calvin et al.

[11] Patent Number: 5,345,389
[45] Date of Patent: Sep. 6, 1994

[54] ELECTRONIC CONTROLLER FOR A GLASSWARE FORMING MACHINE

[75] Inventors: Rick Calvin, Bella Vista, Ark.; Anthony R. Clark, Farmland, Ind.; Will Salley, Bentonville, Ark.; Chuck Bruce, Rogers, Ark.; David Johnson, Bentonville, Ark.

[73] Assignee: VHC, Ltd., West Palm Beach, Fla.

[21] Appl. No.: 871,765

[22] Filed: Apr. 21, 1992

[51] Int. Cl.$^5$ .................. G06F 15/46; C03B 9/40
[52] U.S. Cl. .................. 364/473; 364/143; 364/476; 65/DIG. 13
[58] Field of Search .......... 364/473, 476, 136, 140, 364/141, 143; 65/29, 159, 160, 162–164, DIG. 13

[56] References Cited

U.S. PATENT DOCUMENTS

| | | | |
|---|---|---|---|
| Re. 29,642 | 5/1978 | Kwiatkowski et al. | 364/900 |
| 3,762,907 | 10/1973 | Quinn et al. | 65/164 |
| 3,923,147 | 12/1975 | Quinn | 198/40 |
| 4,247,317 | 1/1981 | Wood et al. | 65/29 |
| 4,266,961 | 5/1981 | Wood | 65/29 |
| 4,368,062 | 1/1983 | Mapes et al. | 65/29 |
| 4,369,052 | 1/1983 | Hotmer | 65/160 |
| 4,382,810 | 5/1983 | Wood | 65/29 |
| 4,402,721 | 9/1983 | Ericson et al. | 364/473 |
| 4,457,772 | 7/1984 | Haynes et al. | 65/160 |
| 4,463,416 | 7/1984 | Wood | 364/143 |
| 4,478,629 | 10/1984 | Wood et al. | 65/263 |
| 4,529,429 | 7/1985 | Wood | 65/29 |
| 4,547,211 | 10/1985 | Ananias | 65/29 |
| 4,641,269 | 2/1987 | Japenga et al. | 364/473 |
| 4,679,148 | 7/1987 | Wood | 364/473 |

OTHER PUBLICATIONS

Emhart Type 300, Forming Control System Brochure.
The CS-150 System, Ball Diversified Products Group Brochure.
IS Apilog Brochure.

Primary Examiner—Jerry Smith
Assistant Examiner—Thomas E. Brown
Attorney, Agent, or Firm—Woodard, Emhardt, Naughton, Moriarty & McNett

[57] ABSTRACT

A timing and control system for a glassware forming machine includes a ship computer system resident within a control room and a hot end console on the shop floor adjacent a multi-section glassware forming machine. The shop computer system executes a number of subroutines which permit configuration of the shop and of each IS machine section, such as routines for identifying on and off angles for the several mechanical devices associated with the sections. The hot end display includes a touch screen which permits the floor operator to implement certain changes in the timing and sequence of operation of the machine mechanical devices. The shop computer system implements subroutines which test for and detect potential conflicts or collisions between machine devices due to changes in the event times for the devices. The conflict testing occurs when the operator inputs the timing change information, issuing warning messages and disallowing the configuration change in the event of a conflict. Timing and sequence functions of the system are implemented using a link table associated with the on and off angles of two subevents for each mechanical device. Linkable records are linked to storage locations in the link tables corresponding to 0.1 degree increments in the shop or machine cycle. Menu driven software facilitates user interface with the timing and control functions of the system, as well as system status reporting functions.

9 Claims, 21 Drawing Sheets

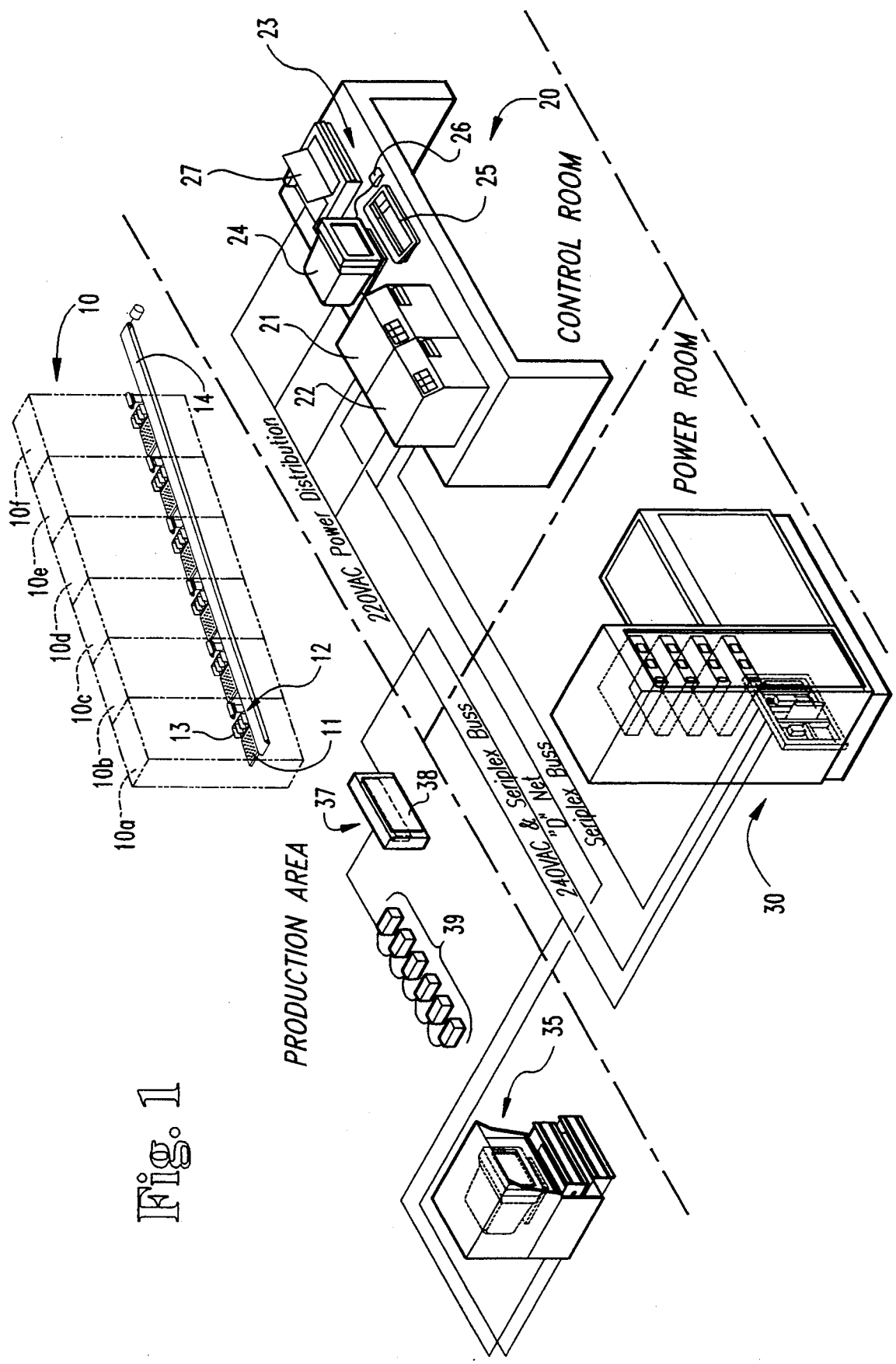

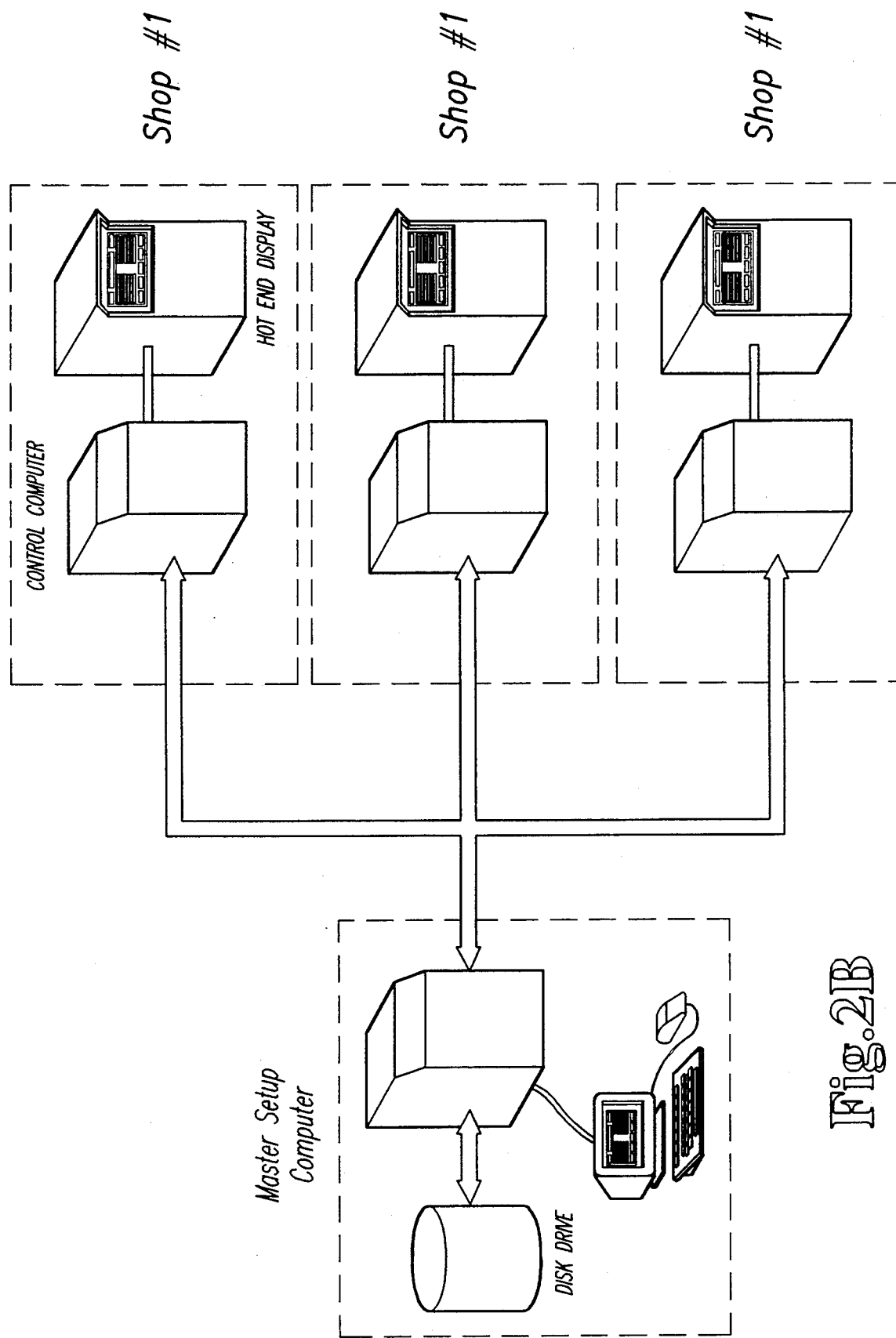

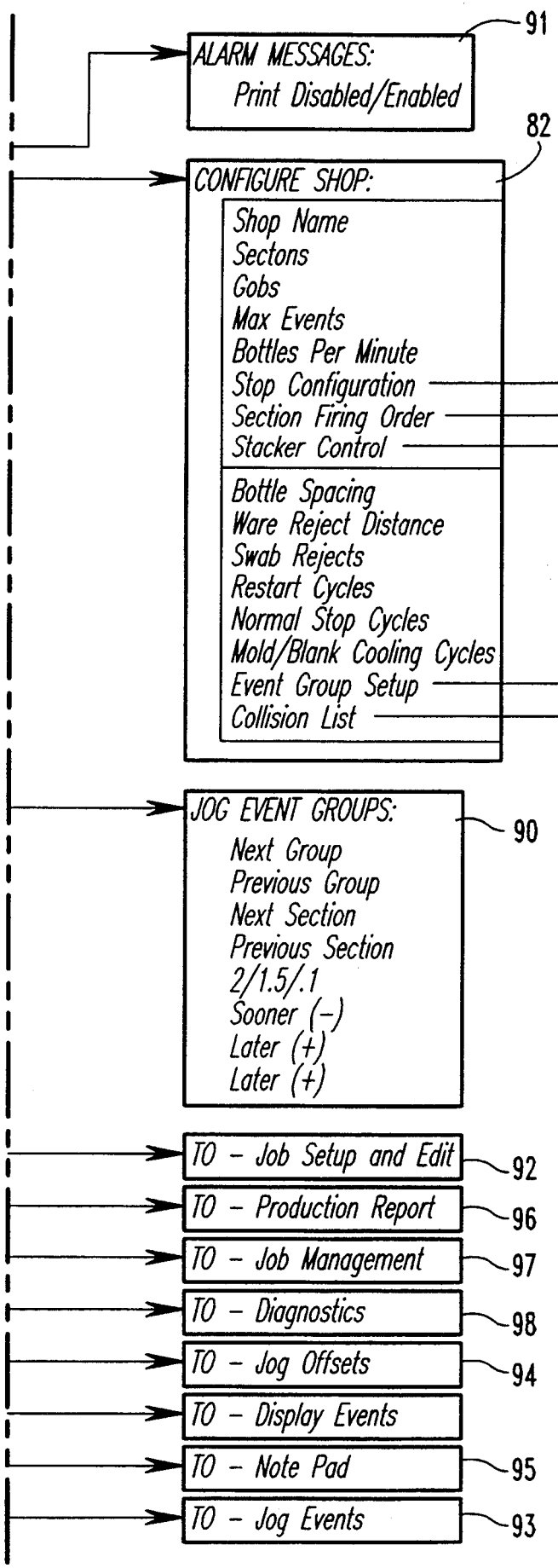
(Fig. 12A)

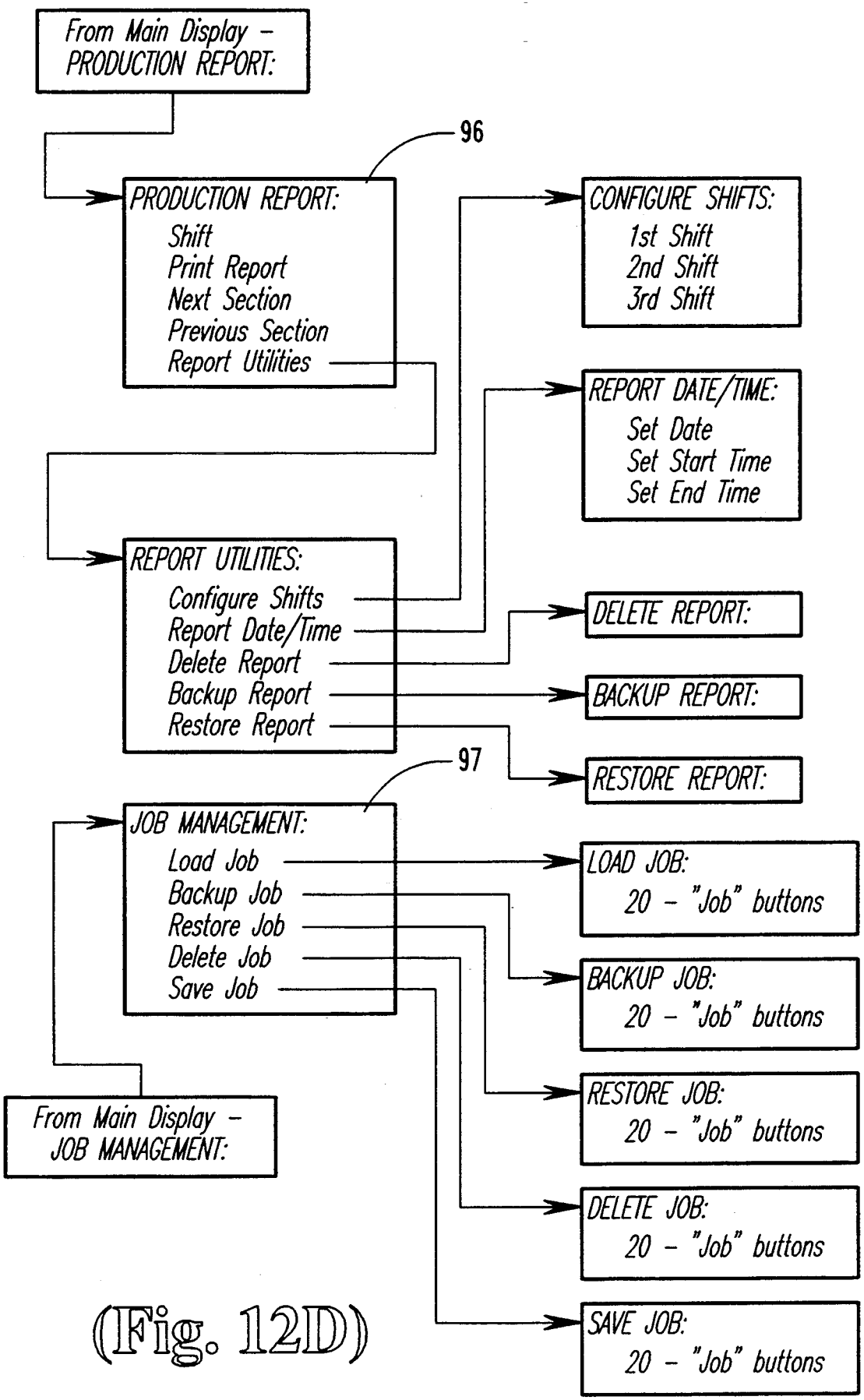
(Fig. 12D)

ELECTRONIC CONTROLLER FOR A GLASSWARE FORMING MACHINE

BACKGROUND OF THE INVENTION

The present invention concerns a computer-based system for synchronizing and controlling the operations of a glassware forming machine. The glassware forming machine includes a number of individual section (IS) machines which receive molten glass from a furnace or forehearth to be molded into a particular glassware article. The article or ware is passed by way of a transfer conveyor to a lehr for annealing the glass. The present invention thus contemplates a computer-based system for scheduling the operation of each section and its mechanical components, and for providing access by the machine operator to modify the glassware forming sequence and timing of events.

A typical glassware forming machine includes a plurality of sections which are each capable of manufacturing glassware by itself. The sections are operated in synchronism according to a particular phase relationship between each section in order to permit the plurality of sections to obtain gobs of molten glass from a single source in an ordered sequence. Each section then forms these acquired gobs of molten glass into a number of finished glassware articles which are then delivered to an output conveyor, again in synchronized fashion. While one section is delivering glassware to the conveyor, another section may be engaged in a different step in the formation of the glassware article. When properly timed and phased, wholly formed glassware articles are produced by each section and passed in an orderly fashion onto the conveyor which transports the glassware articles to a stacker, and ultimately to lehr for annealing.

The glassware forming machine, and each section includes a number of functional components or mechanical devices which perform each of the steps in the glassware forming operation. For instance, the machine includes a feeder for acquiring molten glass from the forehearth and passing the molten glass to a gob distributor. A shear cuts the molten glass into measured gobs. The gob distributor includes a number of scoops which are used to convey the measured gobs to one of the number of sections associated with the gob distributor. Separate motors are used to drive the feeder, shear and gob distributor.

Each section also includes a number of mechanical devices which can be pneumatically, hydraulically or electrically controlled. For instance, each section receives the molten glass and includes a component for molding the glass, or blowing the glass, into a glassware article. The glassware article is typically formed in a section and then transferred to dead plate which can include the component for blowing cooling air onto the glassware article. A pusher assembly is used to push the glassware article from the deadplate onto a moving conveyor adjacent the IS machine. Each sections may include means for forming more than one glassware article. Thus, the pusher may also include a number of arms for simultaneously pushing the number of glassware articles from the deadplate onto the conveyor in unison. Each of the mechanical devices of the IS machine is typically commanded by a valve block which signals the operation of each of the components in an appropriate timed sequence.

In a typical glassware forming machine, multiple sections feed glassware articles onto a common conveyor. Each of the sections may produce up to four articles of glassware at a time. Thus, throughout a single cycle of the glassware forming system, multiple glassware articles can be produced by the totality of the IS machine. These glassware articles mush be properly formed and properly passed to the conveyor so that no conflict results—that is, so that glassware articles do not crash into each other as they enter the transport conveyor. The operation of the glassware forming system requires precise timing of each of the steps of the glassware forming process including formation of the molten gob, distribution of the gob to each section, formation of the glassware article at in each section, and transport of the finished article to the transfer conveyor and ultimately to the lehr.

In past years, cumbersome systems of cams, drum timers and mechanical linkages were used to provide the proper timing and sequence of events for each of the mechanical components of the glassware forming system. In recent years, however, electronic timing has replaced the prior mechanical systems, and solving many of the problems associated with those systems. Electronic timing and synchronization provides more accurate control of the glassware forming process and greater flexibility in manipulating or changing the sequence and timing of glassware forming events.

For the purposes of the following disclosure, a number of terms will be defined which are frequently used in the glassware forming art. In the art, a "shop" is a particular glassware forming machine. This glassware forming machine includes a multiple number of individual sections. A "shop cycle" is the amount of time required for a complete cycle of all events for all of the individual sections forming the shop. For convenience, and configuration purposes, a complete shop cycle has been defined in the art in terms of degrees from 0.1 to 359.9 degrees, usually in 0.1 degree increments.

An "event" is sued to designate a step in the glassware forming process. More specifically, an event is the association of a particular output to change the state of a mechanical device at a certain angle in the shop or IS machine cycle. Each event has an "on angle" and an "off angle" to designate when the particular event begins and ends. For each event, and more specifically for each particular output, a signal is sent to a device controller which is used to activate or de-activate the motors, valves, solenoids, etc., driving the actual mechanical components of the shop. Each mechanical device of every section of the shop will have an output associated with it, and the operation of each of these components will have a specific event associated with it.

Each of the IS machines is operated in a "firing order". This firing order constitutes the order in which each section receives gobs from the gob distributor. As each section is activated in the firing order sequence, each section commences operation at a different angle in the shop cycle. This angle is known as a "section differential offset" which represents the delay from the beginning of the shop cycle before the individual section begins its own glassware forming cycle. Each section also operates in a cycle from receiving the glass gob to forming the glassware article to pushing the article onto the transfer conveyor. Each section cycle has the same duration as the shop cycle so that synchronization is important between the shop and section cycles.

BRIEF DESCRIPTION OF THE DRAWINGS

FIG. 1 is a pictorial representation of the basic components of the timing and control system for a glassware forming machine in accordance with the present invention.

FIG. 2A and 2B are pictorial representations of the timing and control system of the present invention configured for single shop and multiple shop control, respectively.

DESCRIPTION OF THE PREFERRED EMBODIMENT

Figure 2A:
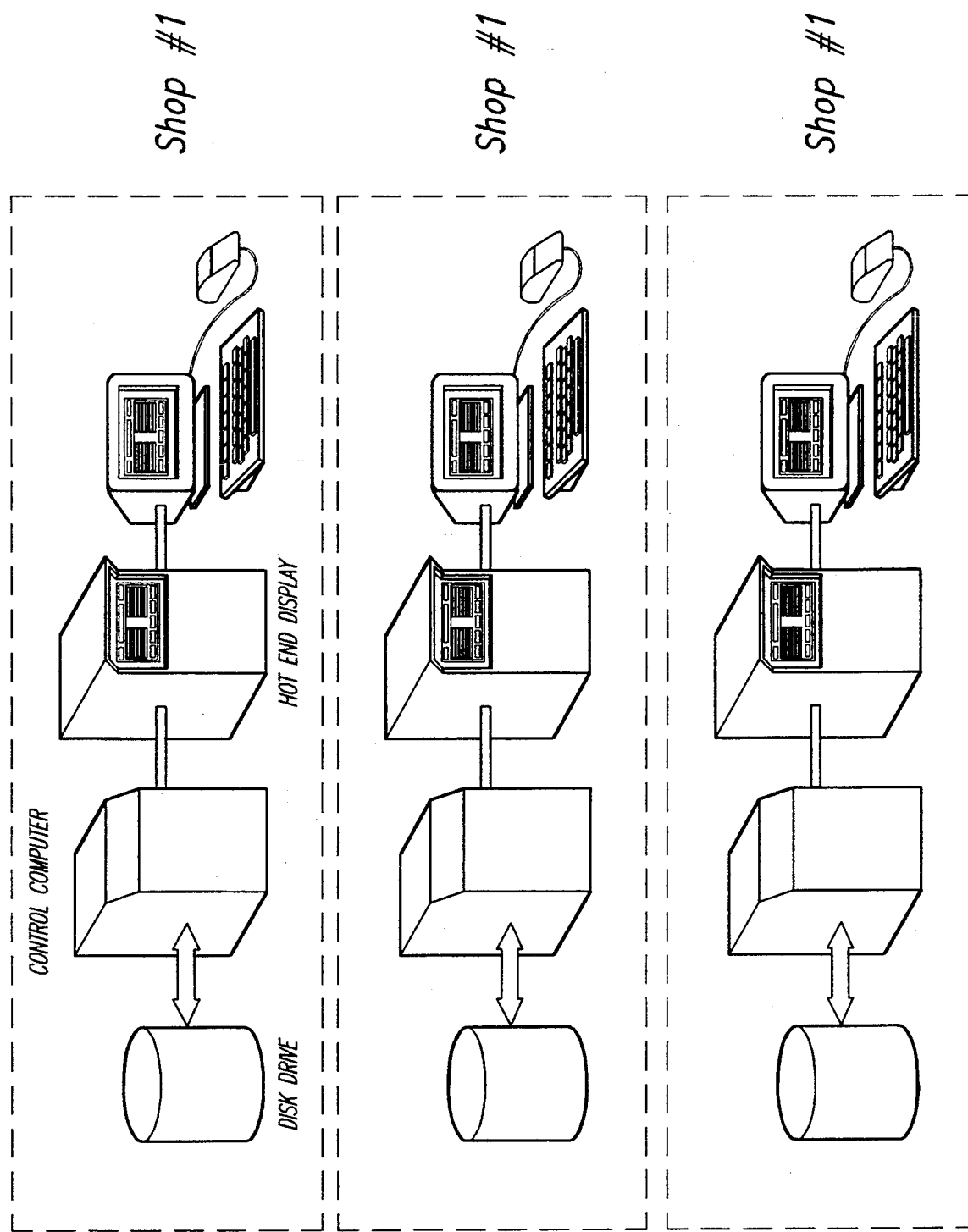

For the purposes of promoting an understanding of the principles of the invention, reference will not be made to the embodiment illustrated in the drawings and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

FIG. 1 shows the basic components of one embodiment of the timing and control system for a glassware forming system of the present invention. FIG. 1 shows a typical configuration for one shop 10 which is made up of six sections 10a–10f. The shop also includes a forehearth for producing molten glass, a feeder, a shear, a gob distributor, a transfer conveyor, a stacker, and a lehr, although these components have not been depicted in FIG. 1. The timing and sequence of operation of these shop devices is preferably controlled by the timing and control system of the present invention.

The deadplates 11 for each section have been shown, as well as a pusher assembly 12 which includes a number of arms 13 for transferring finished glassware articles from the deadplate 11 to a moving conveyor 14. Each section as well as the remaining glassware handling mechanical devices of the shop can be constructed as known in the art. It is understood that the timing and control system of the present invention can be adapted for use in controlling a variety of shop configurations and IS machine components.

The central components of the timing and control system of the present invention is the shop computer system 20 which is situated within a control room separate from the mechanical glassware forming components of the shop itself. In accordance with the preferred embodiment, the shop computer 20 includes a master computer 21 and a shop control computer 22. Each of these computers 21 and 22 may be an IBM-compatible microcomputer, such as a 486 computer operated at 33 Mhz. The function of the master and control computers 21 and 22, respectively, will be described more fully herein. Included with the shop computer is a user-interface 23 which includes a monitor 24, a keyboard 25, a "mouse" or "trackball" 26 and a printer 27. Each of these latter components provides a user-friendly interface for entering new information for controlling the timing and sequence of events, for receiving information concerning the status of the operation of the glassware forming shop and for the passage of other information such as for preparing reports concerning the performance of the shop.

The timing and control system further includes a power distribution panel 30 which resides in a power room that can be separately environmentally controlled. The power distribution panel provides power to all of the components of the timing and control system, as well as to all of the mechanical devices of the IS machine. Preferably, the power distribution panel 30 is configured to provide 220 volts to the components of the shop computer system 20, and 24 volts to the device controllers and mechanical devices. In addition, the power distribution system include a battery backup which allows continued operation of the IS machine mechanical devices after loss of AC power. This battery backup can be operable for a sufficient time to allow all of the molten glass to be purged from the IS machine and to allow the mechanical components of the machine to be moved to a predetermined state in the event of a power loss.

A third component of the timing and control system of the present invention is the hot end display 35. The hot end display is essentially a graphics console situated on the shop floor or in the production area near the particular glassware forming machine 10. The hot end display preferably includes a "touch screen" feature (as described more fully herein), which facilitates the entry of data by the operator and is very user-friendly for the environment within which the display resides.

The next link of the system is the I/O control component 37. This I/O junction box provides power and control signals to the various device controllers and mechanical devices of the IS machines. Preferably, signals received from the shop computer system 20 and the power distribution panel 30, are fed to a junction box 38 which then relays the signals to a number of serial multiplexer modules 39 associated with each section. The use of the serial multiplexers 39 reduces the wiring requirements and provides a more efficient means of providing power and control signals to each of the mechanical components of all sections. This particular feature of the present system is described more fully in co-pending patent application Ser. No. 654,246 filed on Feb. 12, 1991 in the name of inventor Anthony Clark and assigned to the assignee of the present invention. As described more fully in that application, the junction box 37, and particularly the serial multiplexers 39, greatly reduce the wiring requirements and complexity from prior electronic timing and control systems. The disclosure of application Ser. No. 654,246 concerning this serial multiplexer system is incorporated herein by reference.

One significant benefit of the present invention is the ability to configure the shop computer system 20 into a shop network. For example, a typical glass plant will include a number of glassware forming shops. These shops may be forming the same or different glassware articles. It is often desirable to provide a link between each shop, for example, to provide common set-up data between a number of different shops. In addition, linking each of the several shops of a glass plant provides a ready means for producing production reports for the entire plant.

By way of example with reference first to FIG. 2A, the control system of the present invention is shown in the absence of a shop network. It can be seen that three different shops can include their own corresponding central computer and hot end display with an individual disk drive providing storage capability for each individual shop. On the other hand with reference to FIG. 2B, a master set-up computer can be provided (which corresponds to master computer 21 shown in FIG. 1) which interfaces with a single disk drive and a single operator console. In this configuration, the single master set-up computer communicates with a number of individual control computers associated with each shop. Each shop still retains its own section control computer and hot end display; however, information that may be common among each of the shops is provided to and from the master set-up computer and its associated disk drive. This greatly reduces the amount of computer hardware and software required for a particular glass plant.

The function of each of the specific components of the system of the present invention will now be described. The shop computer system 20, and particularly the section control computer 22, is the main controller for the system which performs the shop control functions. The shop computer system also provides shop configuration information, as well as job information. This job information constitutes all of the information necessary to configure the shop to produce a particular type of ware. Job information can be stored on the hard disk of the master computer 21 for retrieval at any time. It is typical in a glass plant that specific glassware articles are produced regularly throughout the year. Thus, the particular timing and control necessary to produce that glassware article may be repeated several times for a given shop. It is therefore preferably to store job setup information so that the timing and control of the IS machine for the particular job can be readily achieved by simply retrieving the job setup information loading it into the timing and control routines within the shop control computer 22 and implementing these routines.

The shop master computer 21 include a programmable security lock feature. This security lock feature permits personnel at the glass plant to assign security access levels for each of the individual control buttons corresponding to specific functions of the timing and control system. A particular shop may have varying degrees of security levels ranging from the operator to a master key level. At the operator security level, only certain functions of the timing and control system can be accessed or actuated by the operator on the shop floor. For example, a security lock may prevent the shop operator from being able to change the overall timing of each of the sections of the shop, while permitting the operator to make modest changes in the timing of a specific mechanical device of an IS machine. At another security level, a "setup level", certain personnel of the glass plant can be permitted to input or change information concerning the initial setup of the shop itself. This setup information can include data concerning the physical aspects of the IS machine.

Additional security levels can be provided for the shift supervisor and the production supervisor for the glass plant. At each of these security levels, the respective supervisor may be permitted to increase the speed of the glassware forming system, or more particularly each shop cycle. In addition, each of the supervisors may be permitted to generate certain report data concerning the operation of the glassware forming machine during a given shift, or during a longer period of time as an indication of the performance of the glass plant. Finally, the master key is designated for the ultimate security level. This master key permits access to all of the information controlled by a master computer 21. In addition, the master key provides access for the plant manager, for example, to determine the security access levels for other employees of the glass plant. It is contemplated with the present invention that each operator and supervisor or other relevant employees of the glass plant are provided with a key-sized security key. This security key includes all of the relevant security access information digitally stored within the key. The key holder can insert the key into a reader associated with either the shop computer system 20 or the hot end display 35, which then reads the information from the digital key to determine the security access level permitted for that key holder.

Both the user interface 23 and the hot end terminal 35 are tied to the section control computer 22 of the shop section control computer system 20. The hot end terminal 35 is used by the operator on the shop floor. In this instance, a touch screen display is highly preferable to facilitate the use of the terminal by the operator. The touch screen display is implemented by a monitor device known in the computer art which permits data entry by simply touching a location on the display screen itself. Since the number of functions that would need to be accessed by the operator is limited, and since the data entry that would normally be made by the operator is minimal, a touch screen provides the necessary degree of flexibility of access by the operator to the timing and control functions of the system.

On the other hand, in the control room, the personnel accessing the user interface 23 will typically need to input a greater amount of information to the master computer 21. Consequently, a keyboard 25 and a "mouse" 26 is provided. It is contemplated that personnel in the control room will be providing information concerning the configuration of the particular shop and the setup of a particular job. The software implemented by the master and section computers, and more particularly the section computer 22, provides user interface to the timing and control sequences by way of a number of different display screens. Certain of the display screens can be accessed only in the control room to control access to certain procedures within the timing and control system.

Figure 3:
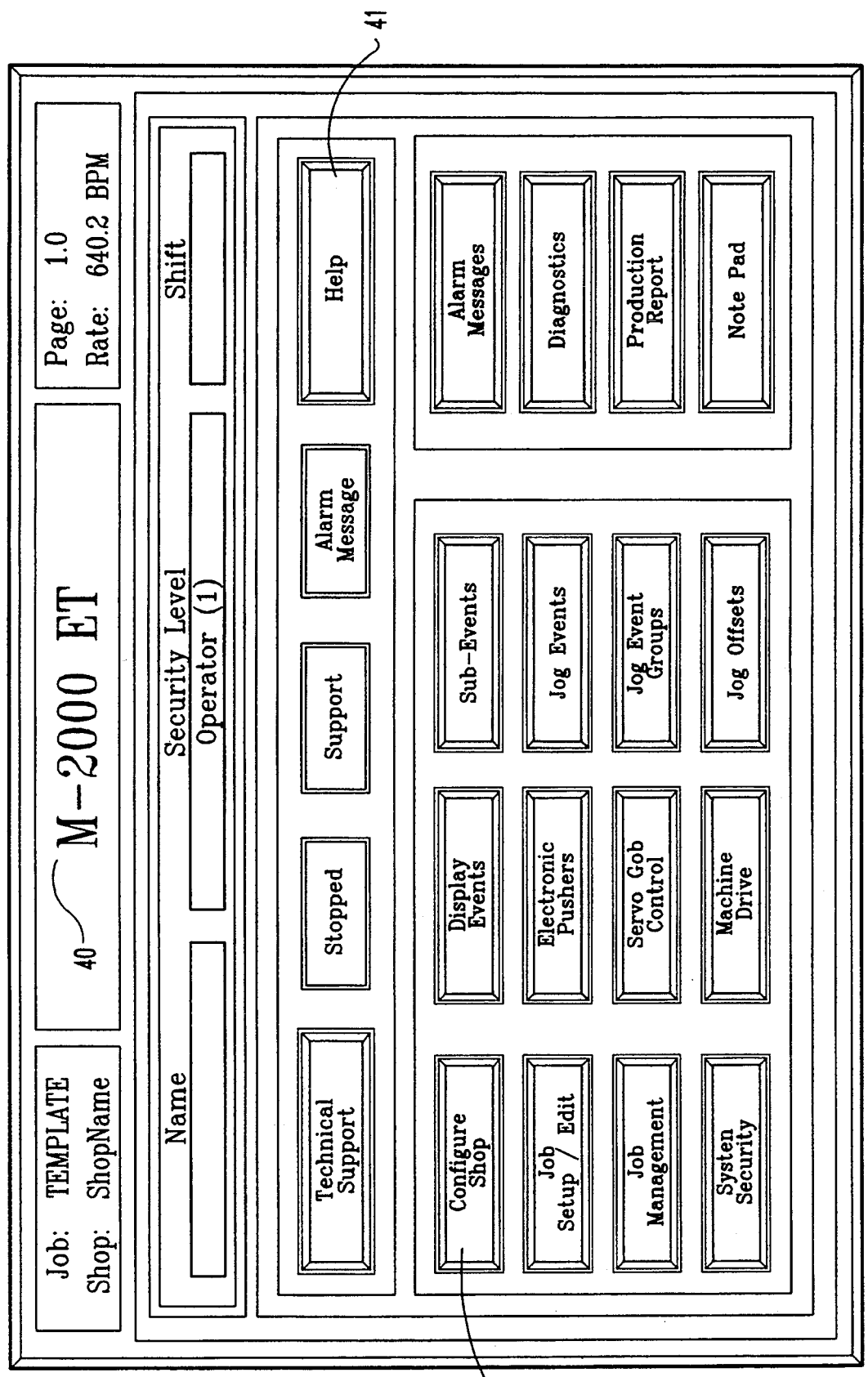
FIG. 3 is a depiction of the primary menu screen implemented by software in the timing and control system of the present invention.

In accordance with the present invention, the timing and control is implemented by software stored in the master and section computers. The software is menu driven to simplify user input and the direction of the process. Each menu corresponds to certain functions, or subroutines, executed by the timing and control system. The primary display screen 40 is shown in FIG. 3. This main screen 40, or start-up screen, displays a number of "buttons" which can be "pushed" by way of the touch screen feature or by use of the mouse and cursor associated with the mouse. Graphics software can be used to give each button the appearance of being up or down, that is pushed or unused. From the main screen, pushing any of the buttons will then direct graphics software to pull up a new screen according to the particular button activated and will direct the timing and control routines accordingly.

Figure 4:
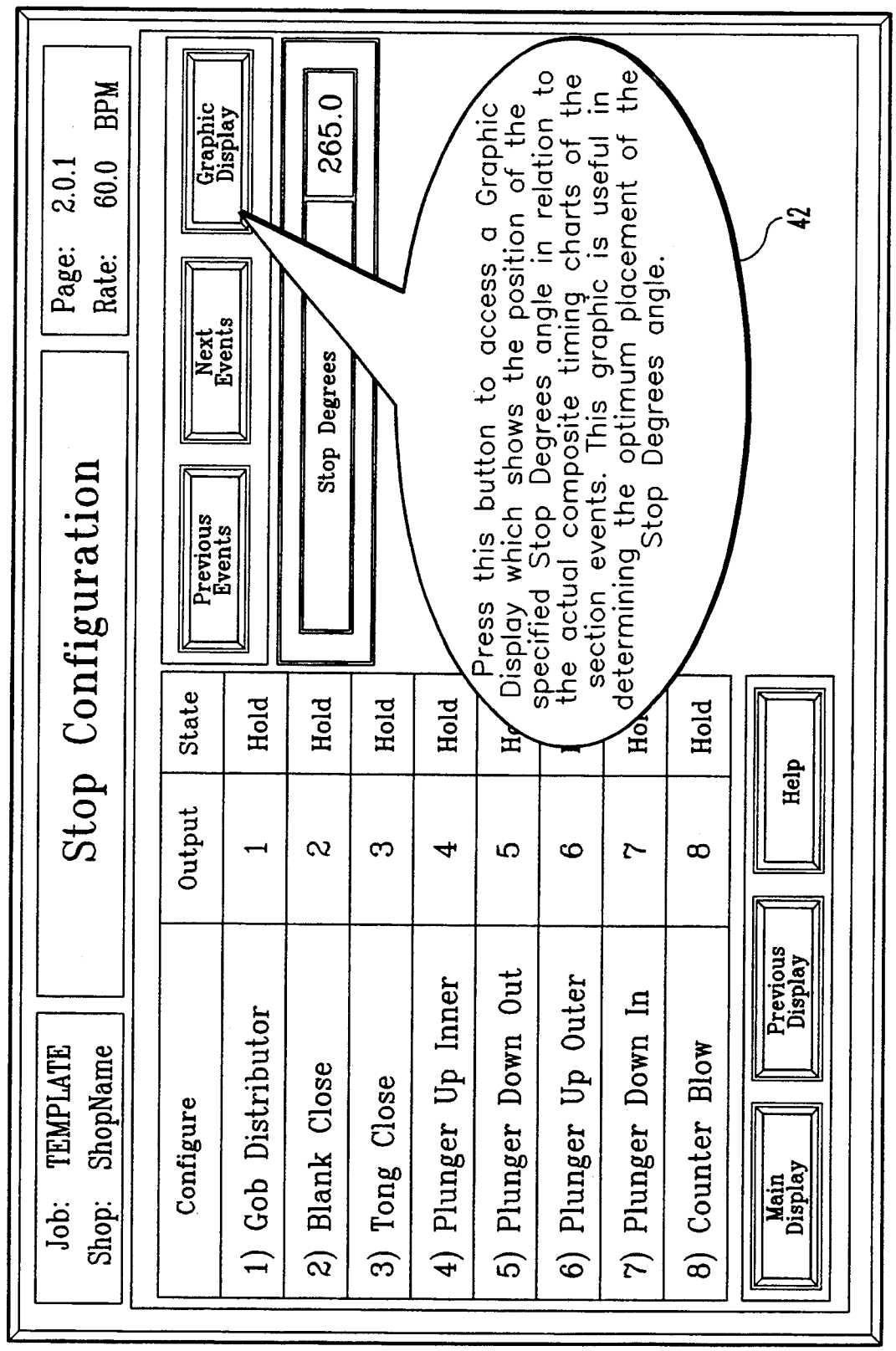
FIG. 4 is a depiction of another menu screen implemented by the invention and particularly showing a help feature of the system.

In one novel feature of the invention, a "help" button, such as button 41, is provided with each screen displayed on the monitor. Pushing this "help" button 41 can produce a display such as shown in FIG. 4, in which a "text balloon" 42 is drawn that includes information concerning the function of a particular screen button. For example, as shown in FIG. 4, the console operator had pushed the help button and then the button labeled "Graphic Display" to provide the text balloon 42 pointing to the graphics display button and informing the user of the function of this particular button.

Figure 5:
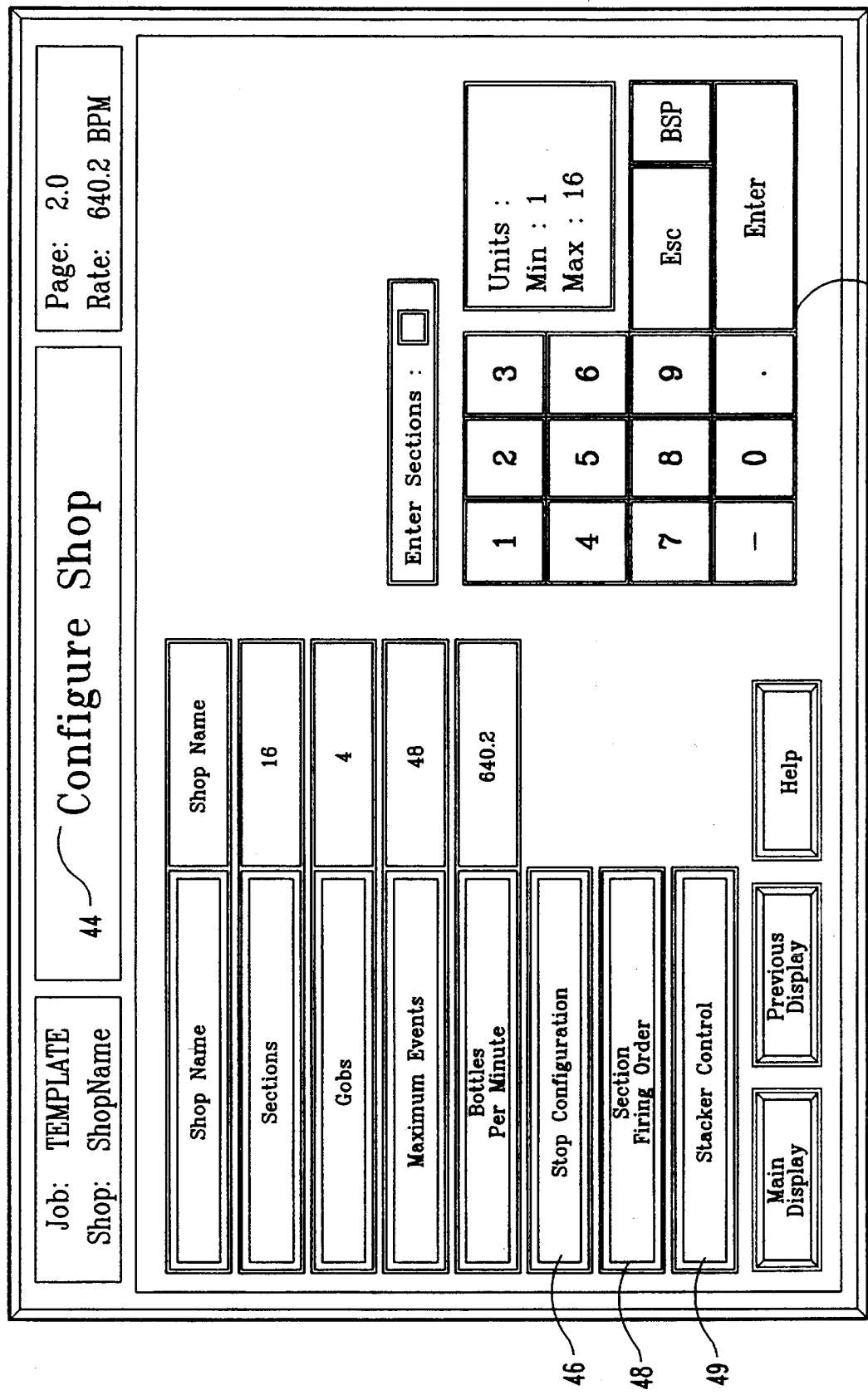
FIG. 5 is a depiction of another menu screen implemented by the inventive system permitting user configuration of the glassware forming shop.

When a particular glassware shop beings operation, the first essential step in using the timing and control system of the present invention is to configure the shop. This configuration step can be commenced by pressing the configure shop button 43 on the main screen 40 that is automatically displayed when the shop computer system 20 is turned on. A sample screen 44 is shown in FIG. 5 which is pulled up when the configure shop button 43 is actuated. At this stage, the control room user can enter specific data when the shop is first installed or when the shop configuration is to be physically changed. This information can include a name for the shop, the number of sections in the shop (that is the number of sections associated with the shop) and the number of glass gobs that will be provided to each section. In addition, shop configuration data can include the maximum number of events anticipated for each section, or in other words, the number of actual outputs that are to be provided to each section for control of the section's mechanical devices. In the preferred embodiment, up to 72 events can be provided for each section corresponding to up to 72 outputs fed to the shop and Is machine device controllers.

As can be seen in the lower right portion of the screen 44, a keypad display 45 is provided which allows the user to input numeric data by using the touch screen or the mouse. Thus, a specific hardware keyboard is not required for data entry. This keypad display 45 can be provided on subsequent menu screens where numeric input is required.

Configuration of the specific shop also requires designation of the number of bottles per minute which are to be produced by the shop. This bottles-per-minute (BPM) entry determines the shop's cyclic rate, or the speed at which the shop will operate to produce glassware articles. The range of speeds for the present invention is preferably 2 to 20 cycles per minute. The number of bottles yielded per minute can be obtained by the product of the cycle speed times the number of gobs per section times the number of sections per shop. The range of speeds for the present invention can yield a minimum of 2 *no.gobs*no.sections and a maximum of 20*no.gobs*no.sections per minute. Thus, for a six section machine with each section receiving three gobs, at a rate of 20 cycles per minute, the BPM would be 20*3*6 or 360 bottles per minute. For a shop operating at 20 cycles per minute, the shop will run through its complete cycle in 3.0 seconds.

The shop rate value derived from the BPM entry is used to pre-set a CPU level interrupt timer to occur at precise time increments representing 0.1 degrees of a shop cycle. The interrupt software is used to accurately synchronize all of the individual sections in the shop. The cycle speed determined by the BPM entry during the shop configuration step also provides the timing signal for all of the timing aspects of the system. In other words, at 20 cycles/minute the shop computer 22 generates a signal every 3 seconds to signify the start of a new shop cycle. This signal is typically referred to as a synchronization signal and is fed to each of the sections to ensure that all of the components of the glassware forming system are in proper synchronization. In operation, the timing between the various sections in a particular shop is dictated by two factors. The first factor is the section firing order, and the second is the section differential offset. The firing order serves to provide means of timing the individual sections together so that each section delivers its completed ware onto the common transfer conveyor in an orderly fashion without interfering with ware already on the conveyor or with ware that will subsequently be placed on the conveyor. The section differential offset provides a means to further adjust the timing between the sections to compensate for factors such as gob delivery rate. The effect of these two timing factors is to offset the start of the machine cycle of each individual section relative to the other sections.

Alternatively, the present invention contemplates receiving a timing signal from an external source. In this case, the BPM value would not be used to set the cycle time. For example, a signal provided from the gob distributor can be used to indicate the start of a new IS machine cycle. Thus, when molten glass is provided to a section from the distributor, the shop can be notified that a new cycle should begin. The shop computer will provide all the timing and synchronization information based upon receipt of the signal from the gob distributor.

Figure 6:
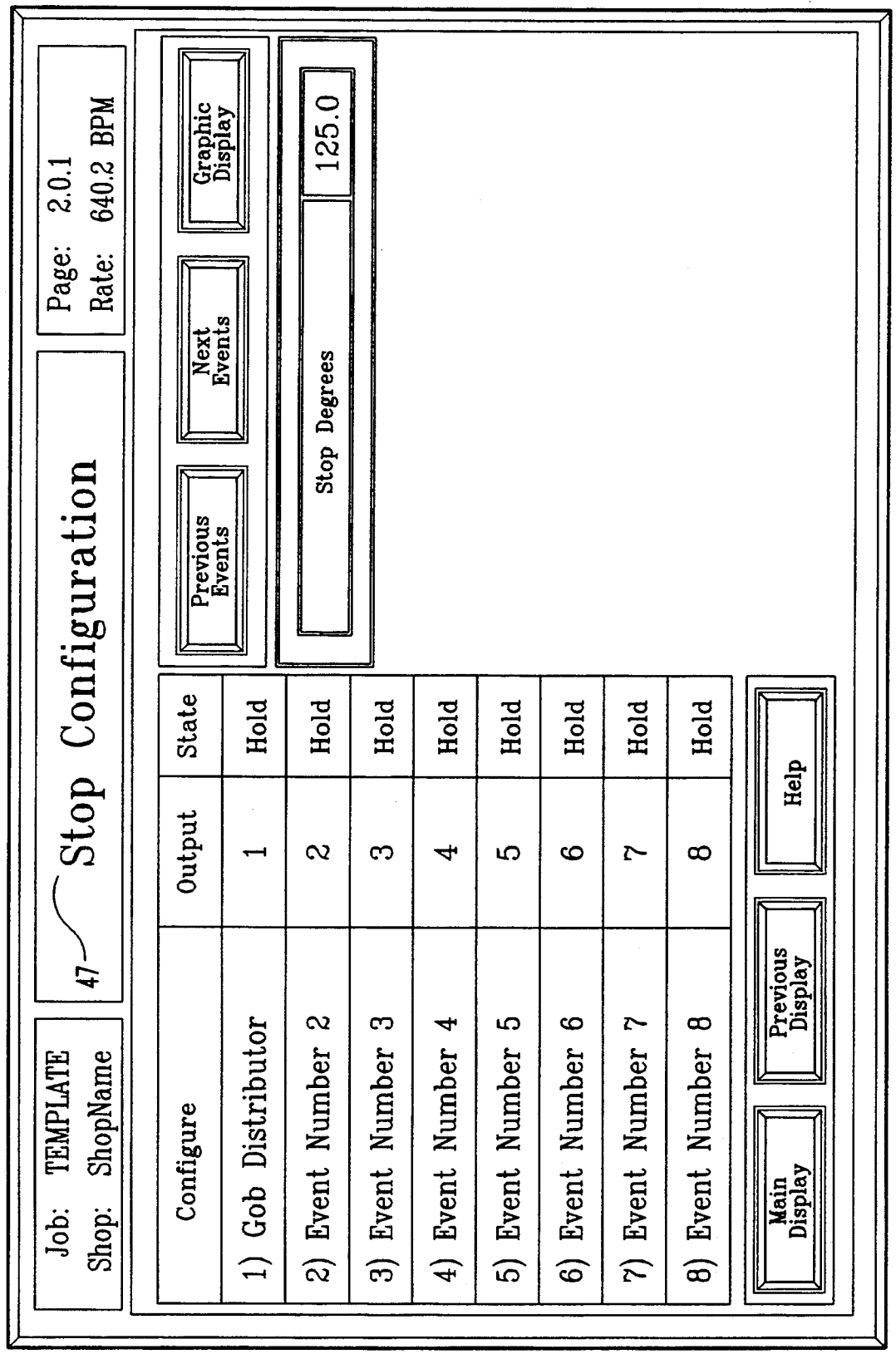
FIG. 6 is a depiction of another menu screen permitting user configuration of the stop states of mechanical components of a machine section.

In a further aspect of the shop configuration step in implementing the timing and control system of the present invention, a stop configuration button 46 provides access to a screen 47 shown in FIG. 6. This screen allows the shop operator to set the particular state of each of the mechanical devices of the glassware forming machine once the operation of the shop is stopped, such as after a programmed stop. Once the operation of the glassware forming machine is resumed, each of the mechanical devices can return to their normal state when the shop cycle is re-initiated. However, the stop configuration input of screen 47 allows the shop operator to predetermine the angle in the IS machine cycle at which the section will stop and the state of its mechanical devices at that stop location. As shown in FIG. 6, the stop configuration of the particular section is set at 125 degrees of the machine cycle, while the state of the associated devices, such as the gob distributor, is "hold", which means that the device remain in that position until the shop cycle resumes. The state of the component can also be maintained "on" or "off" as required under the circumstances.

The configure shop menu screen 44 also includes a button 48 which allows access to another screen providing for input of the section firing order. In one embodiment, a plurality of predetermined firing orders is stored in memory which can be accessed as required for the shop configuration. In addition, any of the predetermined firing orders can be edited to customize the firing order of each of the sections as required for a particular job setup. Menu screen 44 in FIG. 5 also includes a stacker control button 49 which is provided to permit configuration of the stacker control sequence. This feature allows changing the number of glassware articles collected at the stacker for a given cycle. These articles will eventually be pushed into the lehr for annealing. This number of bottles is typically determined by the capabilities of the lehr itself.

Further steps in the configuration of the shop provide additional screens for entry of bottle spacing data. Bottle spacing concerns the distance between the centers of lead bottles for adjacent sections on the conveyor. In addition, the distance between the leading edge of the section to the point where ware can be rejected is provided. This distance information allows the system controller to determine when a particular defective bottle has reached the ware-reject station for manual or automatic rejection. Other data that can be entered includes the number of glassware articles to be rejected at the end of a manual swab cycle, the number of shop cycles during which gob delivery to the sections is disabled following a section restart, and the number of shop cycles to continue section operation after the stop button has been pressed and gob delivery has been stopped. This latter feature sets the number of shop cycles required to purge glassware articles that is in process in each of the sections when the section has been normally stopped. Finally, an additional data entry is permitted for the number of mold/blank cooling cycles in which cooling equipment is disabled after a cold start of a given section.

An additional screen provides the capability for identifying specific events and event groups for each section. In accordance with the present invention, it has been determined that certain events can be arranged into groups for which the timing changes can be made uniformly within the group. For instance, a particular section may include events for gob intercept, tong close, baffle and blank open. Each of these events occur at different angles in the shop cycle. However, when the on/off angles for one of the events within this group of events is changed, the remaining events in the group must also have their event times changed accordingly. Certain events which work in conjunction with other events must have their on/off angles or times changed in unison and by the same amount to ensure proper function in the glassware forming process. It should be understood, however, that each of the events within a group may have different on and off angles. All that is required is that each event in the group be dependent upon the other events in the group so that any change in the on/off angles must be carried through each event in the group.

It has been found that identification of event groups greatly facilitates timing changes in a particular shop setup. In the past, timing changes required "jogging" or incrementing the particular angle on/off angle for every event of a section, which often led to significant errors in setting up the timing of a given shop. For example, in these prior systems, the amount that each of the events was jogged could be inadvertently changed between given events. Moreover, one event that should normally have been jogged with the other events in a group could be overlooked, thereby destroying the sequence of operation in the glassware forming process. With the present invention, designation of event groups eliminates a significant amount of work for the shop operator. With this feature, all that is required is that the operator be aware that a certain group of events, such as events associated with the distribution of the gob to the blank mold, needs to have its timing changed with respect to the shop cycle. The shop computer then makes all the remaining changes necessary to the other events in the group.

Figure 7A:
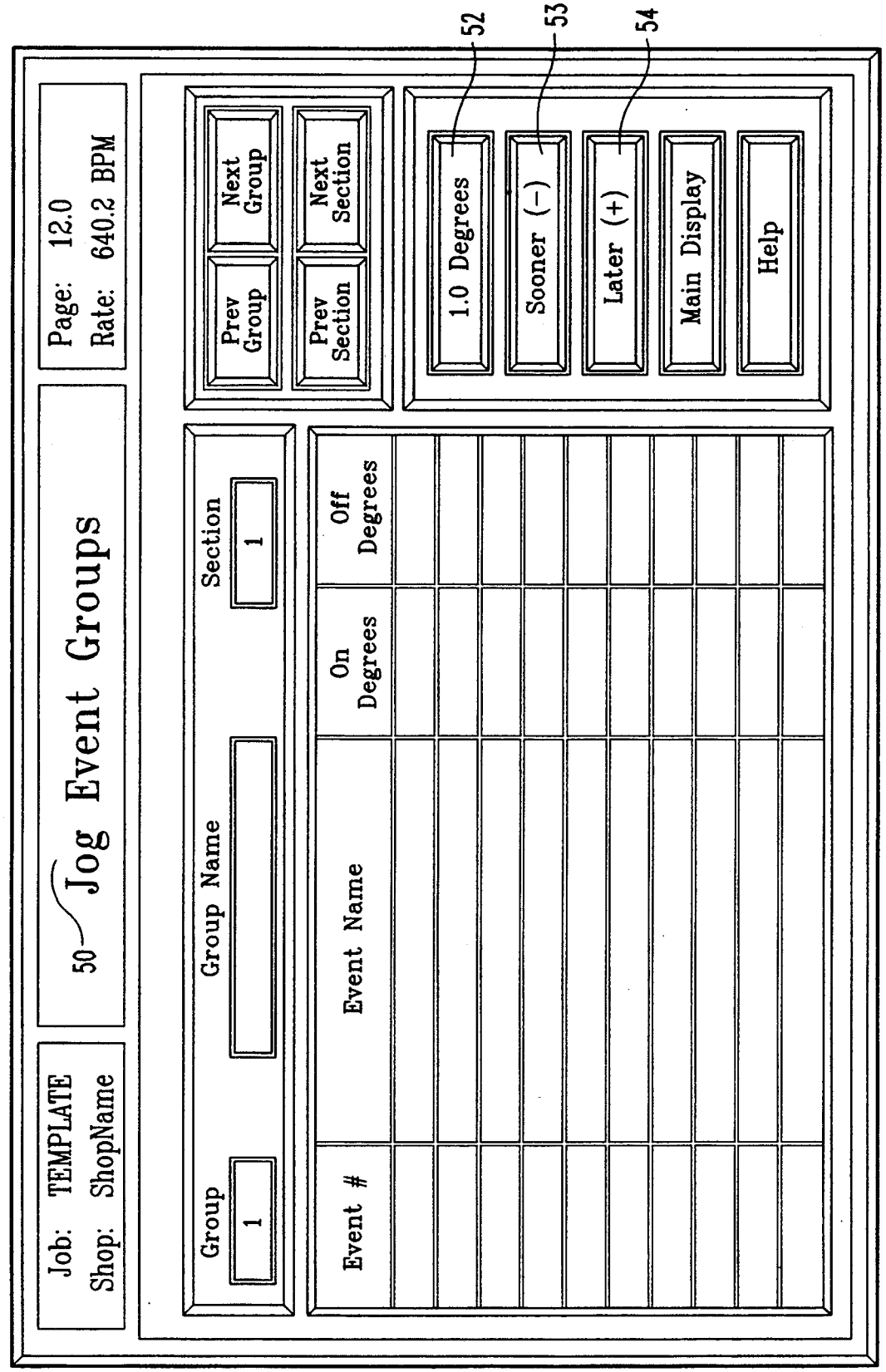
FIGS. 7A and 7B are depictions of menu screens which permit user input to change or jog on and off angles for event groups or specific events in the glassware forming cycle.
Figure 7B:
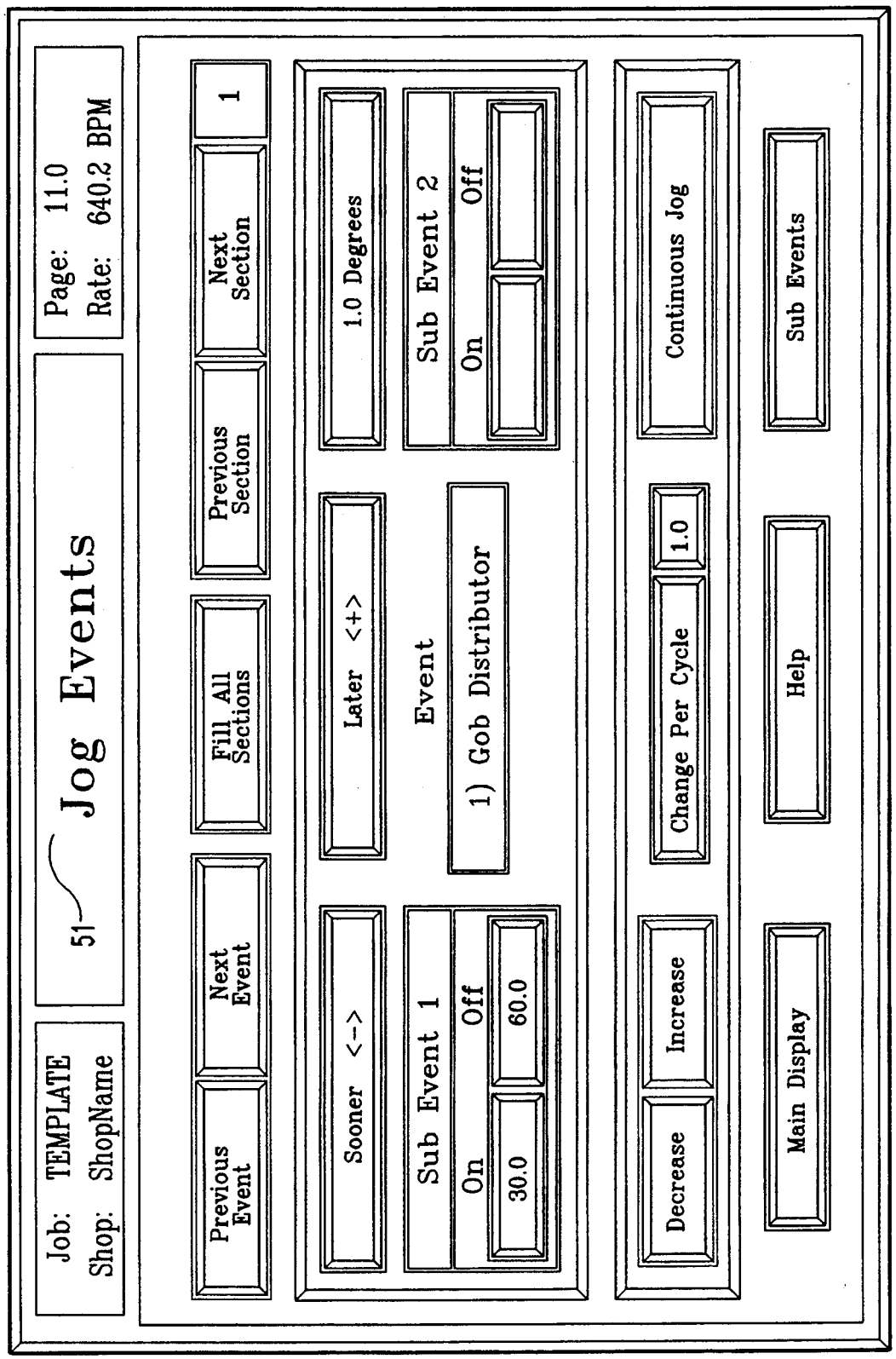

The present invention contemplates the ability to jog event groups or to jog events separately, as shown by the screens 50 and 51 in FIGS. 7A and 7B, respectively. In FIG. 7A, the screen 50 allows for jogging event groups. The buttons at the right side of the screen allow jogging of the particular on and off degree angles. The first button 52 indicates the number of degrees by which each of the identified on or off angles will be incremented when the operator presses either the "sooner" button 53 or the "later" button 54. Pressing the sooner button 53 decreases the on/off angle degrees, thereby causing the particular event group to begin earlier in the shop cycle. Conversely, the later button 54 increases the on/off angles so that the particular events in the group happen later in the shop cycle. To facilitate the jogging step, the button 52 can be toggled to permit angle changes of 0.1, 0.5, 1.0 and 2.0 degrees as required to fine tune the sequence of operations of the system.

Similarly, the screen 51 shown in FIG. 7B permits jogging individual events, rather than event groups. For example, it may be discovered by the operator that the timing of one event within a group is slightly off. In that instance, the operator can pull up screen 51 and individually jog the timing of the specific event within the group. The same sooner/later buttons are provided to correct the event timing.

Menu screen 51 in FIG. 7B also depicts an additional feature of the present invention, namely, the capability of programming two sub-events for a particular machine component. Certain mechanical devices of a section must perform more than one on/off sequence in a single shop or machine cycle. In prior devices, each on/off sequence required designation of a separate event with an output from the computer corresponding to each event. Thus two outputs, and therefor two electrical wires, were required to convey the on/off signals for two events in the cycle of a single mechanical device. However, with the present invention, up to two separate sub-events may be used to define the on and off angles for each sequence for each particular device.

Only a single output is required to interface the shop computer system 20 to the mechanical device. Four signals, 2 "on" and 2 "off", will be transmitted from the output to the device controller. Again, this facilitates modification of the job configuration by the shop operator who need only understand that a given component may perform two steps or events within a shop cycle. With the present invention, the shop operator need only call up the particular components in order to find its two sub-events, while with prior devices, the shop operator must remember that the particular component is associated with two different events separated by a number of degrees in the shop cycle.

Once the shop has been configured and once each of the events for a particular job has been input, the job information can be saved onto permanent memory on hard disk in the master computer system 20. A library of job setups can be developed in the glass plant so that setups in the shop and in each individual section can be readily accomplished by pulling a job file from memory and permitting the shop computer to automatically read this information into the shop control software.

Figure 8:
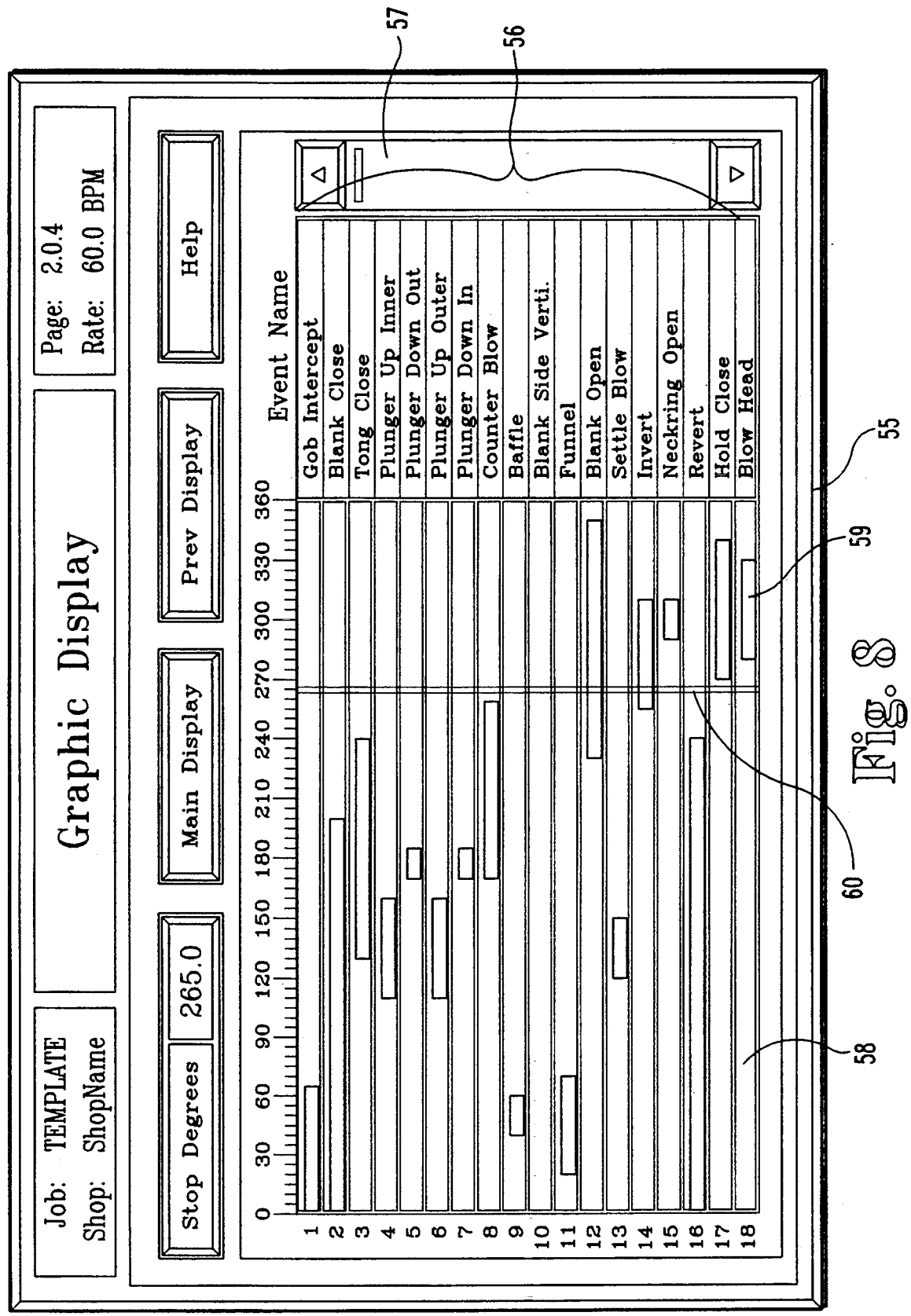
FIG. 8 is a depiction of a screen display in which timing information for a shop is graphically represented.

The shop computer system 20 of the present invention also provides a graphic display of the timing of each of the components of the IS machine in the shop. Referring to FIG. 8, it is seen that a menu display 55 is generated by the control software which includes a number of rows 56 corresponding to several devices of a particular IS machine section. A scroll bar 57 allows scrolling up or down to expose other components of the machine section. In each row it is seen that a black bar extends part way across the row. For example, in the last row corresponding to the blow head, row 58, a black bar 59 extends from about 280 degrees to about 330 degrees. This black bar corresponds to the time over which the particular functional mechanical devices is operating. Thus, the earliest angle, 280 degrees, corresponds to the on angle of the blow head component while the later angle, 330 degrees, corresponds to the off angle for that device. This display 55 graphically shows the on and off angles for all of the section devices as well as a relative depiction of these angles for all of the components of the IS machine. In addition, a vertical line 60 is provided corresponding to the stop degree for the section. In this case, the particular section shown on the figure has a stop angle of 265 degrees which means that upon a programmed stop this section will continue to cycle up to 265 degrees of its cycle before stopping.

Figure 9:
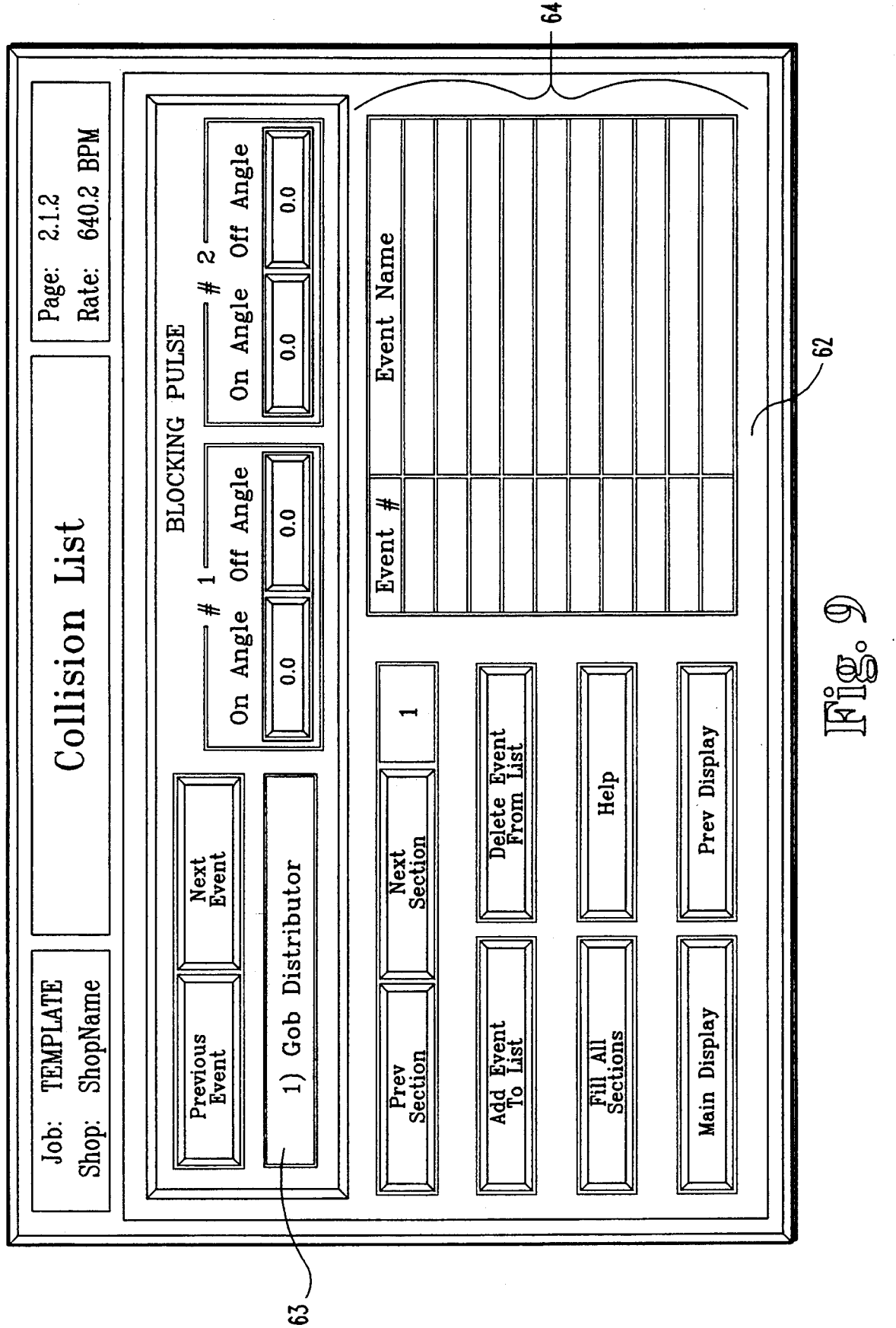
FIG. 9 is a depiction of a menu screen implemented by the present invention to implement conflict testing and detection procedures within the system software.

Another important feature of the present invention is represented in FIG. 9, and particularly the display screen 62 referring to a collision list menu. After a particular shop or IS machine is configured, it is frequently necessary to fine-tune the timing of the operation of each of the devices of the system, or "jog" the one and off angles of those components. Any time the on and off angles of a device is changed relative to other devices of the shop, there is a risk of conflict or collision between the movements of the devices. In some instances, the devices themselves can collide while in other instances, the glass gob or newly formed glassware article can collide with components of the IS machine or with other newly formed glassware articles. In prior mechanical and early electronic control systems, these potential conflicts or collisions were ascertained by trial and error in which the timing of a particular device was modified and the shop run through at least one cycle to determine whether any conflict or collision would occur. Frequently, problems caused by a timing change would not surface for several cycles. This trial and error process was often time consuming and resulted in the loss of newly formed glassware articles. Later electronic control systems have been designed to recognize a collision while the machine is operating and prevent the potentially colliding components from moving.

What is needed, however, is a computer based system which can recognize potential collisions before the angle changes are made to prevent an improper configuration of the IS machine. This feature is provided by the present invention through the collision list procedure accessible through the menu display 62 of FIG. 9. For any event, such as the event shown in block 63 of the display 62, a number of other events, such as in the list 64, can be identified that could potentially cause a conflict or a mechanical interference or collision if activated at nearly the same time. These potential collisions could occur relative to an on angle or off angle of any sub-event associated with the identified device. In accordance with the present invention, a conflict testing and detection process is accomplished by identifying a blocking pulse defined by two angles in the shop or machine cycle. Once a blocking pulse is identified for a particular device or event, and a list of possibly conflicting events is identified, the software within the control computer 22 can ascertain whether a new angle for a particular event will fall within that blocking pulse. If so, the software returns a warning message to the operator and refuses to enter the particular angle change.

Figure 10A:
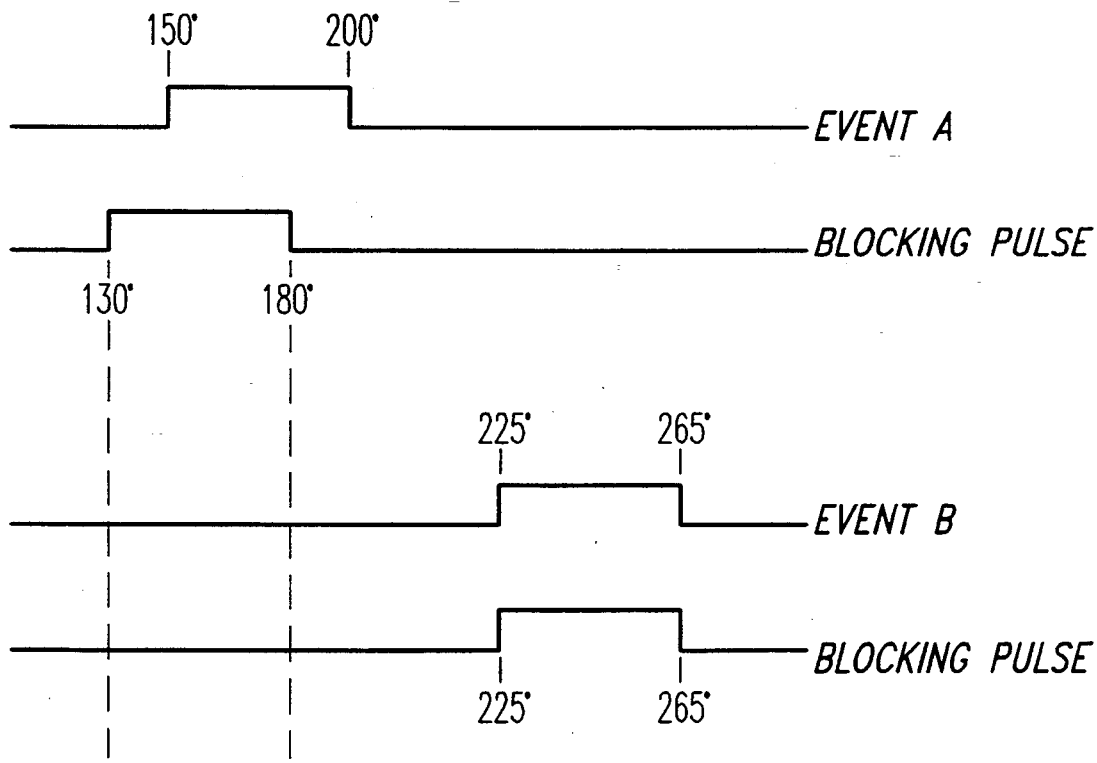
FIGS. 10A and 10B are graphs illustrating the conflict testing protocol implemented by the present invention with FIG. 10A showing a timing configuration resulting in no conflict and FIG. 10B showing a modified timing configuration resulting in a conflict detection.
Figure 10B:
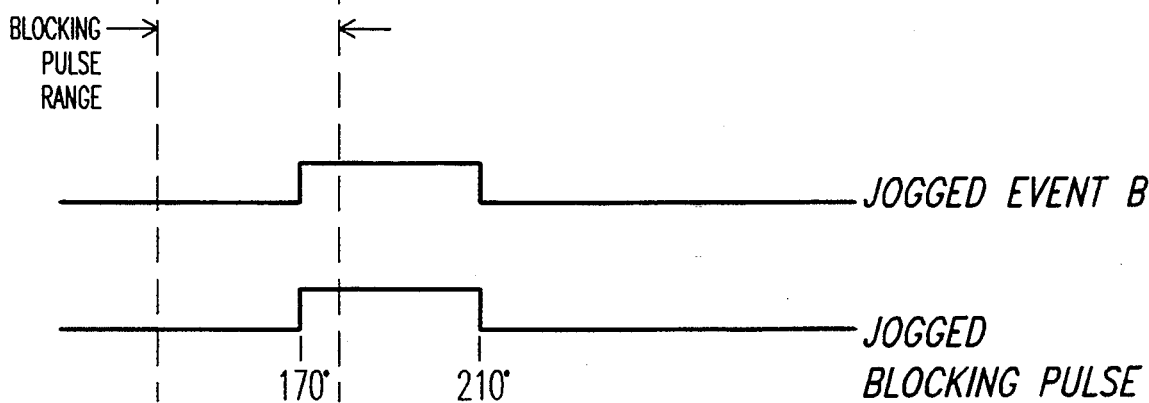

The blocking pulse and its effect is illustrated graphically in FIGS. 10A and 10B. As shown in FIG. 10A, two events, event A and event B, are shown which correspond to activation and de-activation of the mechanical device. The on and off angles for event A are 150 degrees and 200 degrees, respectively, while the angles for event B are 225 and 265 degrees, respectively. The blocking pulse for the on angle of event A is set at −20 degrees and +30 degrees from the angle of 150 degrees. Thus, any device that begins its movement at a time that falls within this range 130°–180° presents the potential for a conflict and that particular angular relationship is disallowed by software within the control computer.

The software of the present invention permits the machine or shop operator to assign a separate blocking pulse to the on angle and to the off angle for every device in the shop. In accordance with the invention, the software preferably compares on angle blocking pulses with other on angle blocking pulses, and likewise for the off angle blocking pulses of devices being tested for conflicts. With this approach, overlap between the on angle blocking pulse of one device with the on angle blocking pulse of another device will yield a conflict determination. In the specific example depicted in FIG. 10A, event B and its on angle blocking pulse are well removed from the blocking pulse of event A and the particular angle configuration is permitted. However, referring to FIG. 10B, it can be seen that event B after it has been jogged to change its on and off angles does pose a collision problem. More specifically, a blocking pulse for event B after it has been jogged, or decremented from 225 to 170 degrees, falls within the blocking pulse range for event A, as depicted by the dashed line extended down between the two figures. The software within the computer system recognizes this overlap between the blocking pulses and disallows the requested jog to the on and off angles for event B.

In operation of the collision prevention feature, the blocking pulse for the event identified in menu display block 63 in FIG. 9 is compared to the blocking pulses for each of the events shown in the event list 64 on the display 62. It is understood that the events in the event list 64 may themselves have their own collision list for comparison with other events in the same list or with new events in a different list. The high-speed computing capability of the control computer 22 permits very rapid consideration of the collision list for all of the events for a section, even up to the maximum allowed 72 events. The computing capability of this control computer can readily handle 72 events, each preferably having up to 10 events in its collision list, although typically, only a few components are at risk for conflict or collision.

Referring again to FIG. 10A, it can be seen that the blocking pulse for event A is offset by 20 degrees from the on angle of 150 degrees for the event. This 20 degree difference operates as a kind of collision buffer based upon the understanding that there may be some inherent delay between the time that a signal from the device controller changes state and the actual physical response of the associated mechanical device. In some instances, the timing of specific events may in fact overlap on the display of FIG. 8, but due to this delay time, no actual conflict would result. Identification of a blocking pulse can account for this inherent time delay and consequently the collision testing and detection software only refers to the blocking pulses, rather than to the specific on and off angles for a given event.

During the system and shop configuration steps performed in the control room by a control operator, each section of the shop is configured. Ideally, each section will have the same configuration and timing sequence once a gob is received at the particular IS machine section. With this in mind, an operator can simplify the configuration and setup process by arranging the configuration for one section and then copying that configuration into the events list and collision list for other sections having an identical configuration. This feature greatly simplifies and speeds up the operator's task of configuring a shop. The software is also capable of filling identical information into all events for the current section. For example, if the stop state of all the components of a given section is a hold condition, one keystroke is all that is required to copy this state of condition for all the remaining events for the section.

Figure 11:
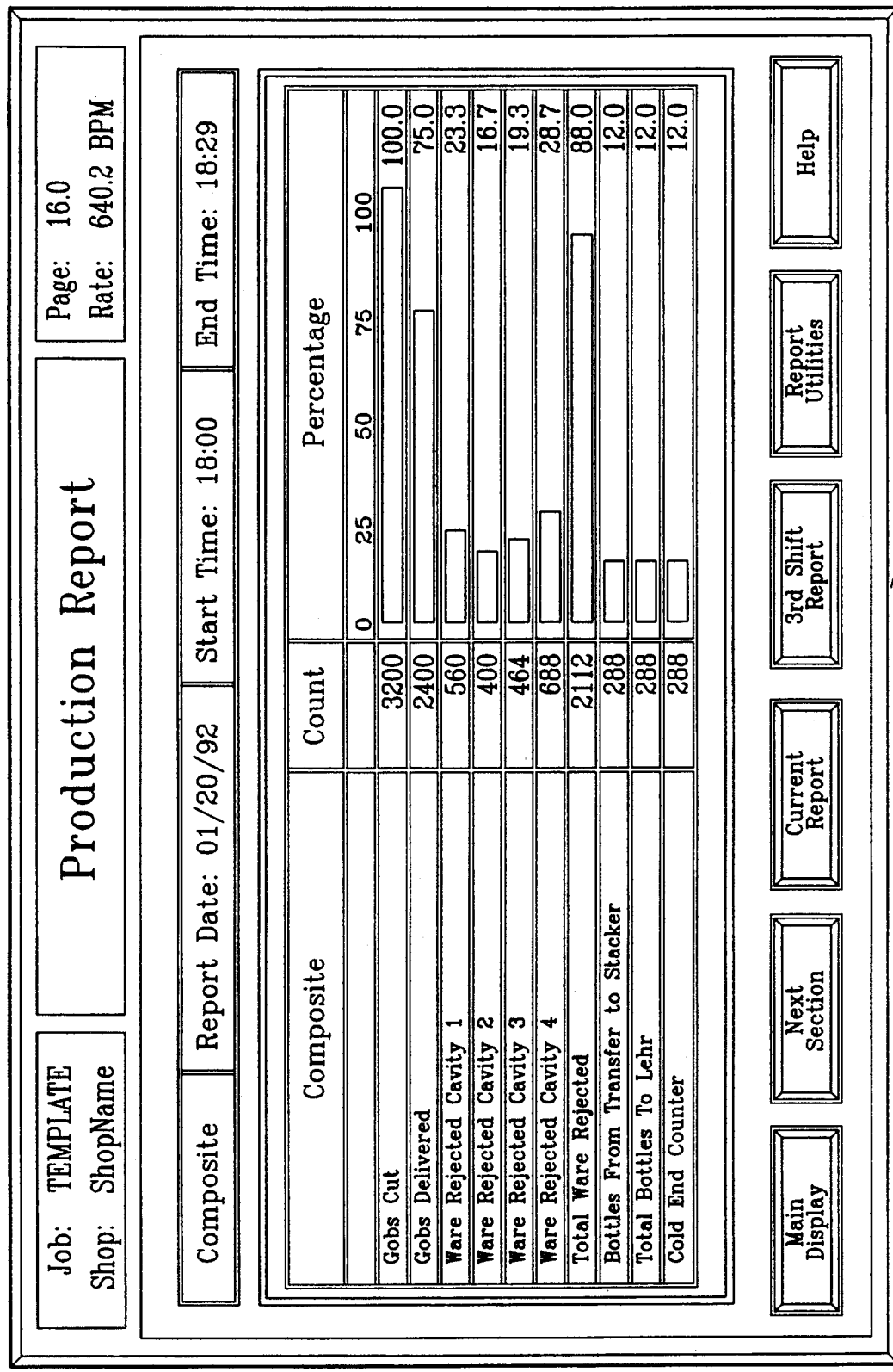
FIG. 11 is a depiction of a screen displaying production report information concerning the performance of a glassware forming shop.

In addition to the setup screens, shop computer system 20 is also capable of producing production reports to depict the performance of the particular shop. One such report is shown in FIG. 11. The display 68 can include a variety of information including the number of gobs cut and delivered, ware rejected for each section, and the total ware rejected for the shop, bottles transferred to the stacker and the total ware transferred to the lehr for annealing. The production report can be based upon a particular work shift or totaled for an entire day or any portion of a day. The reports can be isolated as to a specific section or in the case of a networked system, a particular shop or the sections within that particular shop. Counters or proximity sensors at several stations along the shop and each IS machine can provide signals necessary to count each step in the glassware forming process.

Figure 12A:
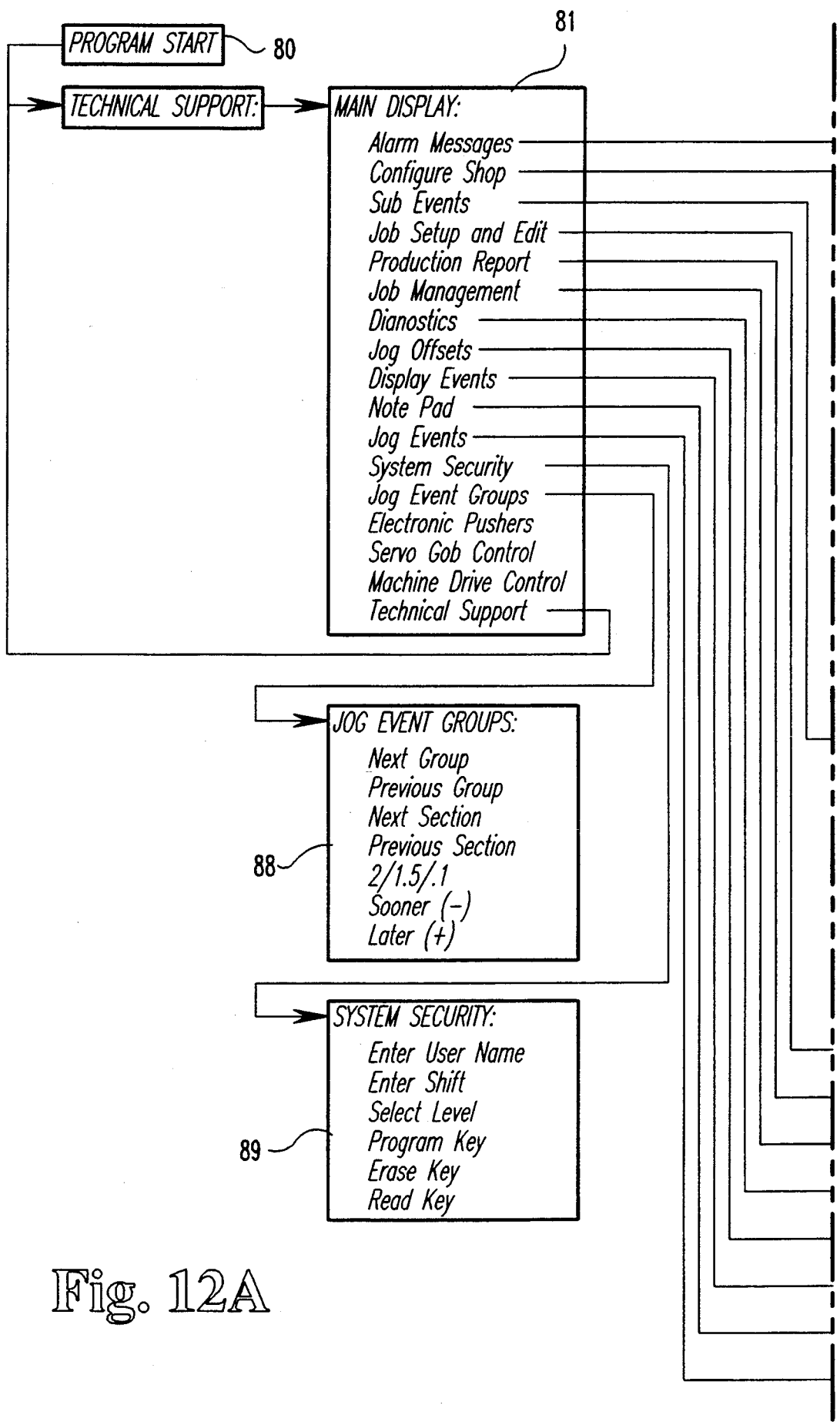
FIGS. 12A–12D are flowcharts showing each of the subroutines implemented by software within the timing and control system of the present invention.
Figure 12A:
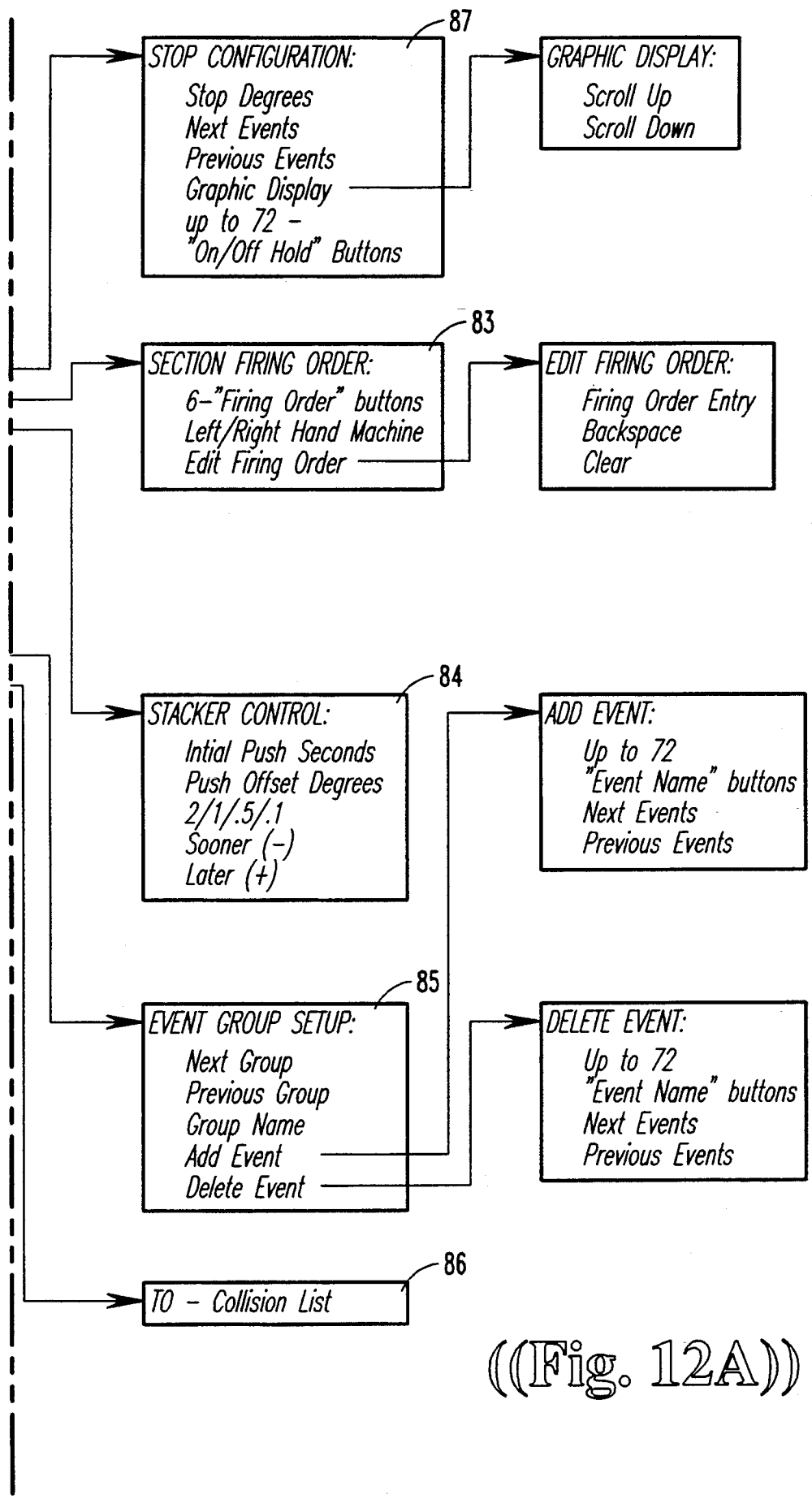

Each of the foregoing features, in addition to further features of the timing and control system of the present invention, is described further in the flow charts 12A–12D. In the first flow chart of FIG. 12A, it is seen that immediately upon program start of the software contained within the shop computer 20, the main display shown in FIG. 3 is brought up on the monitor screen. The main display includes a number of buttons which can be activated by the operator to send program control to any one of a number of subroutines, such as the routine for configuring the shop shown in block 82. The shop configuration subroutine identified in block 82 also references additional subroutines for generating the section firing order 83, stacker control 84, event group setup 85, preparing the collision list 86, and preparing the stop configuration 87 for each section and each component of the section. The main display 81 also provides access to a subroutine 88 for jogging event groups and subroutine 89 for determining system security features. Additional subroutines for creating sub-events, step 90, and for acknowledging alarm messages, step 91, are provided. In step 91, alarms messages generated by software within the system controller can be read and printed. As each alarm message is read, the color of the message on the screen is changed to indicate that it has already been read so that it will not be confused with newly generated alarm messages.

Figure 12B:
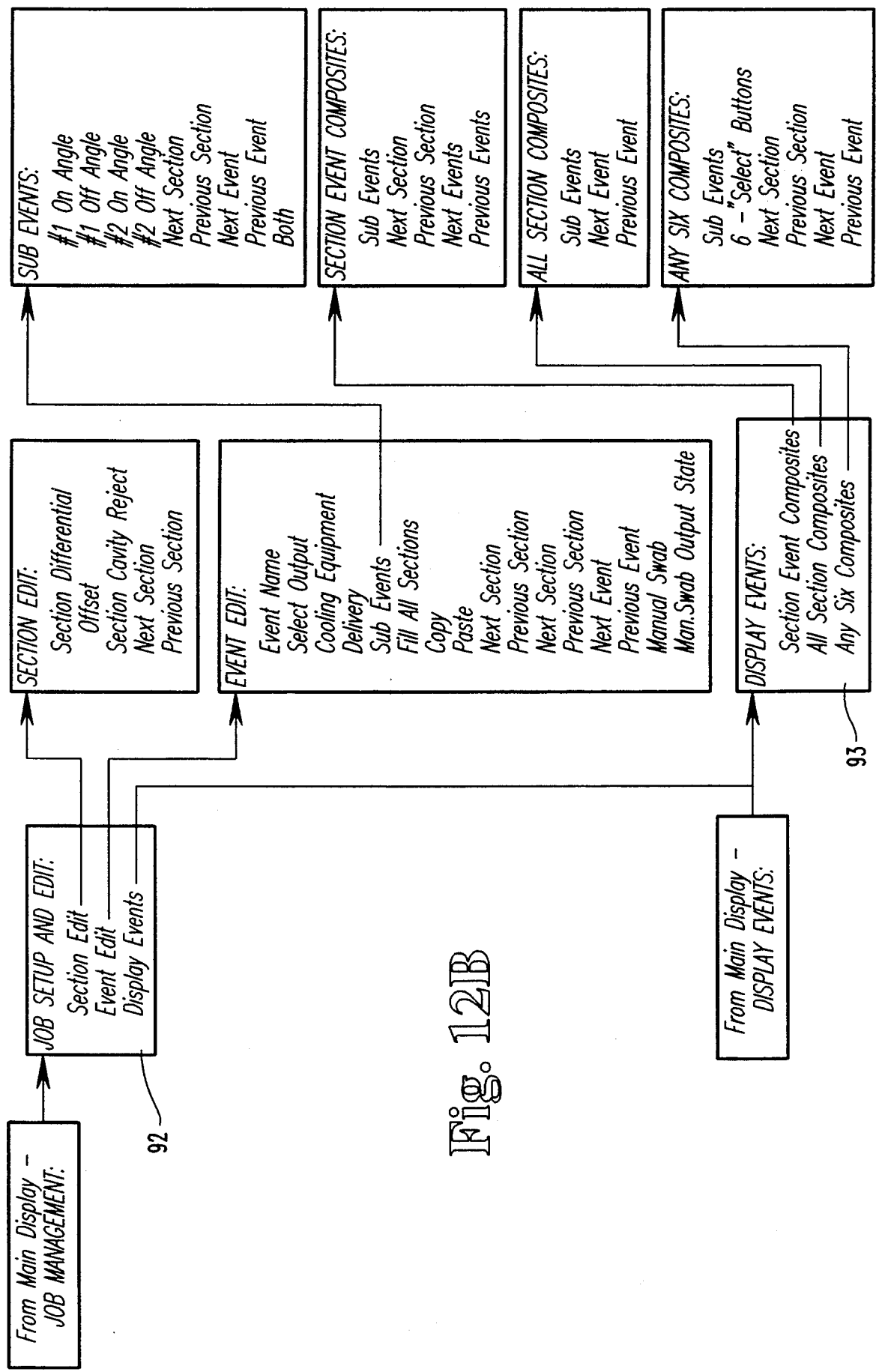
Figure 12C:
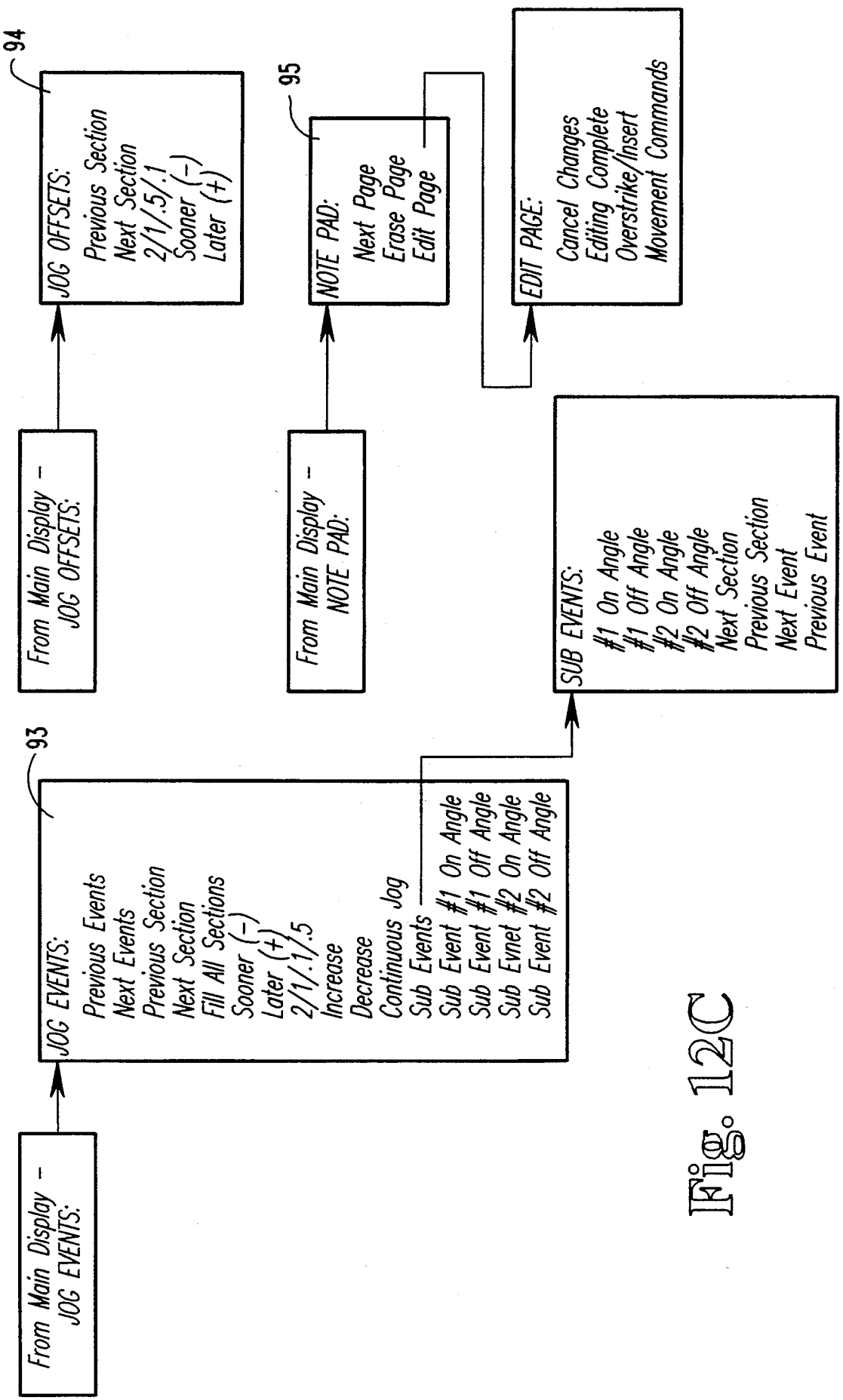

The main display is also used to access subroutines for job setup and edit, which is shown in more detail in FIG. 12B. As described above, in the hob setup and edit portion of the system control, each specific attribute of each section and each event can be created and edited. In addition, the job setup and edit subroutine includes subroutines 93 for displaying particular events. The events can be displayed for each section, or a specific event among all sections can be displayed. In addition, displays of any combination of events and sub-events can also be displayed, depending upon the requirements of the operator.

A subroutine 93 can be accessed through the main display to job specific events. As described above, the events can be jogged in multiple or partial degree increments, either to activate the on and off angles sooner or later in the shop cycle. In addition, a continuous jog feature is provided in which the particular event is jogged with each successive machine shop cycle. This particular feature can be of value when an operator is trying to fine-tune the operation of the glassware forming system. For example, if the event corresponds to activation of the pusher arm for transferring the glassware articles from the deadplate onto the conveyor, continuously jogging the timing of the operation of the pusher can allow the operator to make sure that glassware from a particular section falls in proper sequence and spacing relative to glassware fed to the conveyor from the other sections. Once the operator is satisfied with the on and off angles for the particular event, the continuous jog feature can be disabled and the particular timing sequence stored in memory for the remaining cycles of operation of the shop. In addition to jogging particular events, certain offsets for the system can be jogged, incremented or decremented. For instance, offsets for the start times for each section can be modified relative to the zero angle of the machine shop cycle. Other offsets for the stacker control or other components of the IS machine can also be increased or decreased.

Figure 12D:
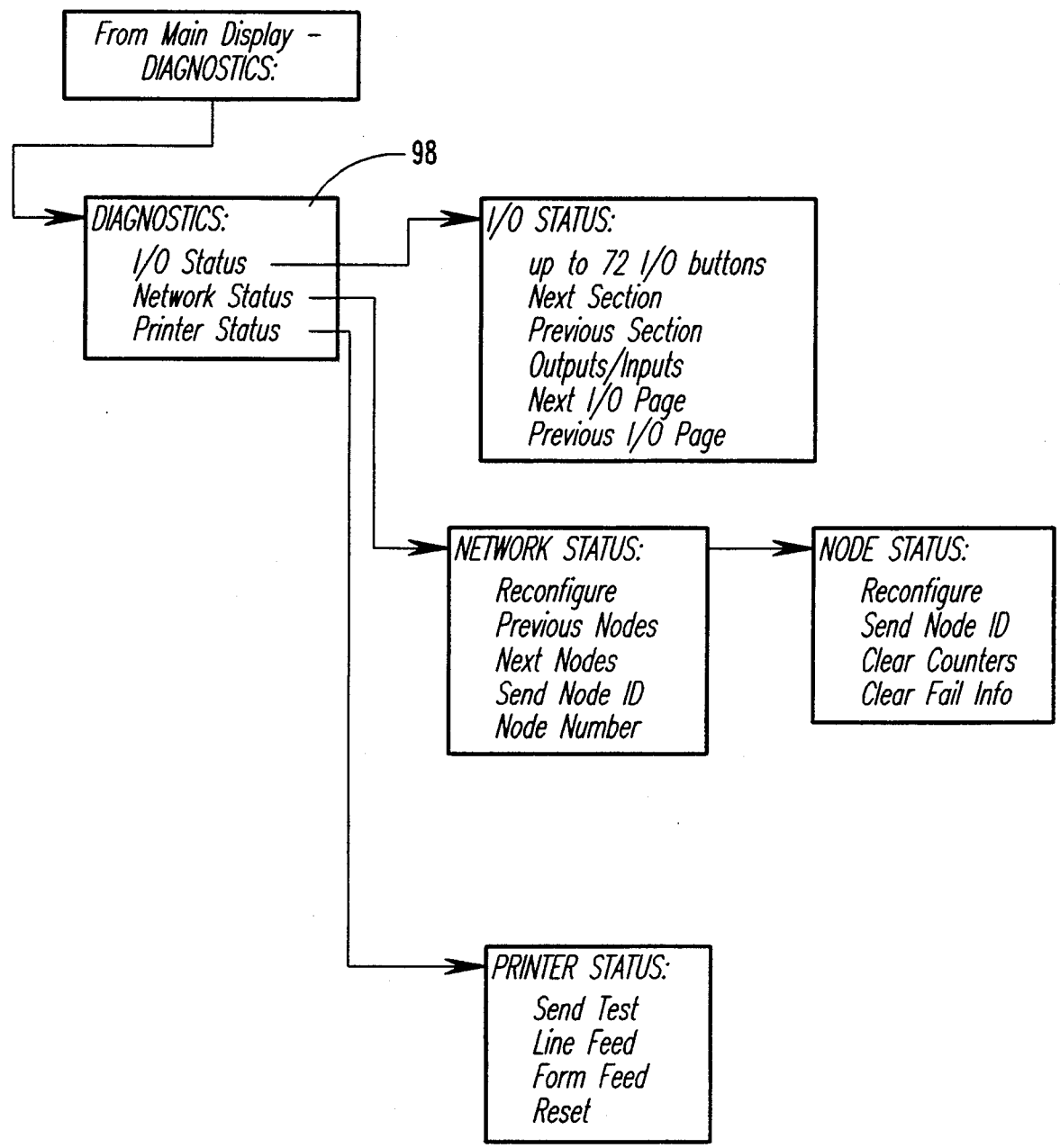

The present invention also contemplates a notepad feature 95 which allows an operator to leave messages for subsequent shift operators. Another subroutine 96 allows a system operator to generate a variety of production reports as described above. A further subroutine 97 allows access to existing job setup information or permits an operator to store job management information on hard disk for future use. A diagnostics subroutine is also provided, which is shown in more detail in FIG. 12D. This diagnostic subroutine provides information concerning the status of the I/O components of the system, the network to other shops if present, and the status of the printer in the shop computer system.

It is understood that each of the subroutines accessible from the main display 81 operate in the background in the operation of the shop computer system 20. The present invention also contemplates software that operates in the foreground for performing the basic timing and synchronization functions of the system. Typically, these foreground routines read the timing information from the variety of user inputs, and specifically from the job setup information, to determine when "on" (activation) or "off" (de-activation) signals are to be sent to the specific device controllers of the IS machine and shop. For example, the foreground routine maintains the shop cycle time and generates a synchronization signal once every shop cycle. On the other hand, when the timing and control system is operated in a slave mode, the background routines can read a signal from an encoder separate from the shop computer to determine the synchronization and timing of the IS machines in the shop. For example, an encoder can be mounted to the gob distributor, shear cutter or feeder to generate a pulse each time molten glass is provided to the shop. This encoder signal can be used to determine the real time for a particular shop cycle in a manner described previously. The operation of the IS machine is then synchronized to this external encoder signal.

The foreground timing routines also monitor specific components of the shop to determine synchronization stability. For example, the gob distributor, shear cutter or gob feeders can be monitored to ascertain whether they are providing the molten glass to the individual sections in accordance with the anticipated shop cycle.

The foreground timing and control routines within the shop computer system 20 access the on and off sub-event data points for each of the components of each section of the shop. The rotation cycle of the IS machine is emulated digitally in 0.1 degree resolution increments. Each 0.1 degree increment corresponds to a storage location in a run time data base maintained by the shop computer. Thus, for a full cycle of operation of the shop, that is 360 degrees, 3,600 storage locations are utilized. In accordance with the present invention, 3,600 storage locations are provided for "on" times for the first sub-event and 3,600 storage locations are provided for the on angles for the second sub-event. Likewise, the "off" times for first and second sub-events are also provided with 3,600 storage locations each. Each separate array of 3600 storage locations can be referred to as a "link table" in accordance with the present invention.

A separate single storage location is provided for a current angle pointer. This current angle pointer is sequentially incremented through each of the 3,600 storage locations for all four link tables. This current angle pointer corresponds to the instantaneous time or angle in the shop cycle. For example, if the current angle pointer is pointing to storage location 1800 in each of the link tables for the two on and two off times for the sub-events, this corresponds to an angle in the shop cycle of 180 degrees.

Each of the four link tables provide entry points for accessing linkable records contained in memory. The storage location in the link tables can contain an address of the first linkable record "linked" to or associated with the particular storage location or specific angle in the cycle. Each linkable record contains two pieces of information. The first is an identification of a particular device or event whose output is to be updated at the specific angle point of the cycle. The event output will be turned on or activated for an on sub-event link record and will be turned off or de-activated for an off sub-event record.

The second piece of information contained in each linkable record is the memory address of another record to be linked to the particular angle. This other record references another device or event that is to change state at the angle. Thus, the present invention contemplates a "daisy chain" of event linkable records queued together from a particular storage location in the linked list representing the 360° of the machine or shop cycle. Software in the control computers read the storage locations in the link tables to determine if an event is associated with the angle represented by the storage location. If not, the pointer is moved to the next storage location in the link table. If so, the software reads the storage location to find the first linkable record. The contents of the first record are read and the state signal (on or off) is sent to the appropriate device identified in the linkable record. The software also looks in the record to ascertain if another linkable record has been linked and the program flow passes accordingly.

Figure 13:
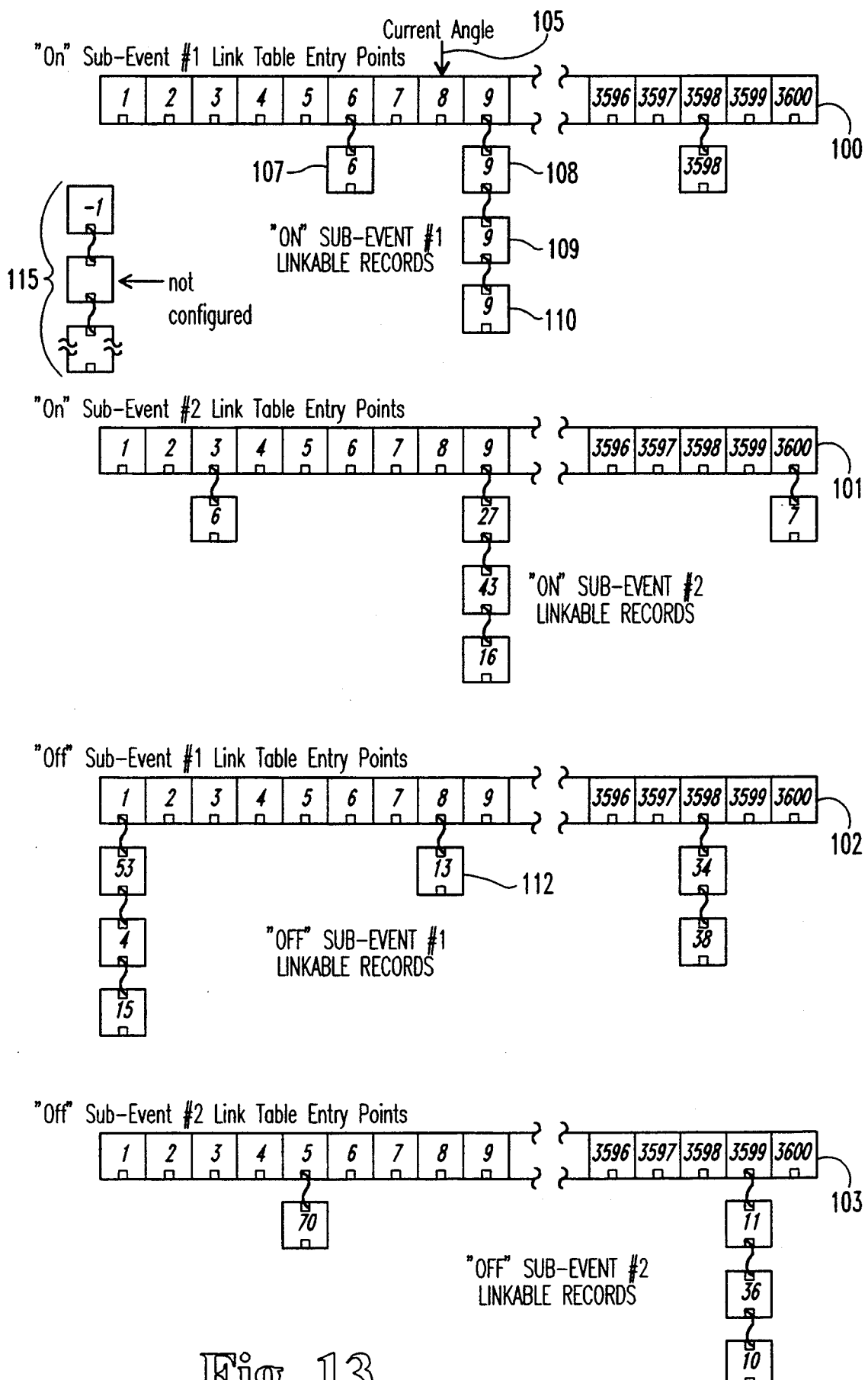
FIG. 13 is a block representation of the configuration of memory locations in the present invention utilized to provided linked lists of events which implement the sequence and timing functions of the timing and control system of the present invention.

This important feature of the present invention is shown diagrammatically in FIG. 13. In this figure, it can be seen that four link tables 100, 101, 102 and 103 are provided. The first link table corresponds to on times for the first sub-event, while link table 102 corresponds to the off time for that sub-event. Likewise, link tables 101 and 103 correspond to the on and off times for the second sub-event. It should be borne in mind that the present invention contemplates that each component of the IS machine may operate more than once during a cycle, in one or two sub-events. Thus, the link records 101 and 103 acknowledge the possibility of having a second sub-event for the particular component. As can be seen from FIG. 13, each of the link tables 100–103 for the sub-event on and off times includes 3600 address or storage locations which correspond to every 0.1 degree increment in the shop or machine cycle. The current angle pointer 105 is shown pointing to location 8 in each of the link tables 100–103. Thus, the current angle pointer in this specific example is pointing to a corresponding angle in the cycle of 8×0.1, or 0.8 degrees.

Referring more specifically to the first link table 100 corresponding to the on times for the first sub-event, it can be seen that addresses storage locations 1-5, 7-8, 10-3597 and 3599-3600, include no records linked thereto. However, at addresses 6, 9 and 3598, separate records are "linked" to these particular addresses. For example, at location 6 in the link table, corresponding to a cycle time of 0.6 degrees, a linkable record 107 is linked thereto which includes the number of a particular component of the IS machine to change state at the angle. In the specific example, the device 13 could correspond to, for example, an electronic pusher, a scoop, a mold closing mechanism, or other functional component of the IS machine. This record is read and the particular device identified in that record, device 13, is turned on or activated in accordance with the link table 100. It can be seen that at the same time or address location 6 in the remaining link tables 101-103 no other linkable record is connected to any of the other link tables. Thus, at that particular instant in the cycle, no other device will change state, either activated or deactivated, except for component 13 represented by linkable record 107.

Advancing to location 9 just past the illustrated position of the current angle pointer 105, it can be seen that three records 108, 109 and 110 are associated with that particular current angle storage location in the link table. Thus, when the current angle pointer 105 advances to location 9, the software will sequentially read the three records 108-110 to ascertain that IS machine devices 3, 9 and 1 are to change state.

Referring next to the link table 102 for the off times for the first sub-event, it is seen that at location 8 corresponding to the illustrated location of the angle pointer 105 a linkable record 112 is associated with that particular location. The component identified in that record 112 is component 13 which was turned on at location 6 in accordance with the link table 100. Thus, the system controller will direct that this same device be turned off, or de-activated, once the current angle pointer reaches location 8.

Referring again to the link table 100, there are several records 115 depicted as not being configured. This means that the particular devices identified in these records are not linked to a particular angle in the link table. However, the operator can identify any one of these records during the job set-up steps by specifying event angles for the devices identified in the non-linked records. Software will then digitally "link" that record to an appropriate link list storage location.

It should be apparent that the linkable records, such as linkable records 108-110 associated with a specific angle or time, can be identified as an event group. Similarly, linkable records at different locations, such as linkable record 107 and 109 can also constitute a particular event group, with the understanding that these two components must have their on and off angles incremented or decremented concurrently and equally in accordance with the event group philosophy. Changing the event items linked to a storage location in the link table is accomplished by a run time editor which accesses the linkable records in real time during the operation of the IS machine. The run time editor in effect "unhooks" the linkable record for a particular sub-event from its entry point to the link table and hooks that record onto a different entry point or angle location. For example, the linkable record 107 corresponding to device 13 can be moved from its entry point location 6 to entry point location 4 in response to jogging the on time for component 13. Changing the location of the linkable record with respect to the link table 100 then means that this linkable record 107 be accessed 0.2 degrees earlier by the current angle pointer 105. In instances where multiple records, such as records 108-110 are associated with a particular entry point location, removal of a particular linkable record may require patching the remaining records back together. For instance, if record 109 is to be removed, a new link must be established between record 108 and 110 since these records are intended to remain at the particular entry point 9.

As previously described, the present invention contemplates control of up to 72 components per section. Thus, each of the sub-event on and off link tables can include 72 linkable records. All 72 linkable records could be associated with a single entry point corresponding to a single angle in the shop cycle time, or some or all of the 72 records can be dispersed to different ones of the 3600 entry points corresponding to the full 360 degrees of the section cycle. It is further understood that each section of the shop includes its own collection of link tables 100-103. A current angle pointer 105 is unique to each section.

The cycle through the link tables for each section is initiated with respect to the overall shop timing provided by the shop computer system 20. As previously expressed, the shop cycle is determined by the bottles per minute, the number of sections and the number of gobs per section, or alternatively is determined based upon an external signal such as from the gob distributor. At any rate, this signal from the main computer synchronizes each of the section cycles based upon angle offsets for the beginning of each IS machine section cycle. In other words, each individual section commences its particular run cycle at a different angle in the overall shop cycle. Thus, the first section of a six-section IS machine may begin at the zero angle of the shop cycle, while the next adjacent cycle can begin at the 30 degree point in the shop cycle. This 30 degree value corresponds to a section differential offset which can be input by the operator during the shop configuration step. Each section will typically have a different section differential offset so that each section is beginning its individual section cycle at different absolute times in the shop cycle. By this approach, the operation of each section and particularly the on and off angles for each of the components of each section, can be identical for all sections. In other words, the link tables 100-103 can be identical for every section. However, the absolute time in the shop cycle at which these link tables are commenced can vary based upon the section differential offset. It should be understood, however, that the current angle pointer 105 for each section is advanced at 0.1 degree increments simultaneously for every section in synchronization with the shop cycle pointer maintained by the master computer.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of controlling at least one individual section of a glassware forming machine, the individual section receiving gobs of molten glass and having a plurality of mechanical devices operable in timed relationship with respect to one another to form the gobs into glassware articles, wherein the mechanical devices are each cyclically actuated by a respective device controller at respective relative times during a cycle of operation of the individual section, the method comprising the steps of:

providing a list of locations in a computer memory corresponding to a list of sequential times during one cycle of operation of the individual section;

providing a number of groups of digitally linked memory storage locations, wherein a unique vale is stored in each storage location, the unique value identifying one of the mechanical devices of the individual section;

digitally linking each of the number of groups to a respective location in the list of locations, the respective location corresponding to an event time in the individual section cycle at which each of the devices identified by the linked storage locations of the respective group is to change state between an "on" or active state and an "off" or inactive state;

sequentially addressing each location in the list of storage locations at fixed time increments of the individual section cycle;

determining whether a group of linked storage locations is linked to the addressed location in the list of storage locations; and if a group is detected in the prior step, reading the unique value of each linked storage location of the group and providing a signal to a device controller corresponding to the mechanical device identified by the respective unique value to change the state of the mechanical device.

2. The method of controlling at least one individual section of a glassware forming machine of claim 1, wherein:

the step of providing a list of locations includes providing a first list of locations corresponding to the "on" state of the mechanical devices and a separate second list of locations corresponding to the "off" state of the mechanical devices;

the step of digitally linking includes linking groups separately to the first and second lists of locations;

the step of sequentially addressing includes simultaneously addressing corresponding locations in the first and second lists; and the step of reading the unique value and providing a signal includes providing an "on" signal to mechanical devices identified in groups linked to the first list of locations and an "off" signal to mechanical devices identified in groups linked to the second list of locations.

3. A glassware forming system comprising:

at least one glassware forming machine having a plurality of individual sections, each section having a plurality of mechanical devices actuatable to operate in synchronization through a cycle of operation of the glassware forming machine to form glassware articles;

a gob feeder for providing molten glass to each section of said glassware forming machine;

a plurality of device controllers for controlling the actuation of a corresponding one of said plurality of mechanical devices;

a computer-based system controller including;
 a plurality of signal outputs, one each corresponding to and exclusively providing signals to one each of said plurality of device controllers;
 means for storing two pairs of times for each of said plurality of mechanical devices corresponding to two actuations of the device during one cycle of operation of the glassware forming machine, each pair of times including an "on" time corresponding to activation of the device and an "off" time corresponding to deactivation of the device;
 means for determining the time elapsed in a cycle of operation of the glassware forming machine;
 means for transmitting a device control signal at one of said outputs corresponding to one of said plurality of device controllers when the "on" and "off" times for each of said two pairs of times equals the time elapsed in the cycle of operation, thereby activating and deactivating the corresponding mechanical device twice during a cycle.

4. A glassware forming system comprising:

at least one glassware forming machine having a plurality of individual sections, each section having a plurality of movable mechanical devices actuatable to operate in synchronization through a cycle of operation of the glassware forming machine to form glassware articles;

a gob feeder for providing molten glass to each section of said glassware forming machine;

a plurality of device controllers for controlling the actuation of a corresponding one of said plurality of mechanical devices;

a computer-based system controller including;
 means for storing in a memory a plurality of on/off times for each of said plurality of mechanical devices;
 means for cyclically transmitting device control signals to each of said plurality of device controllers in response to a corresponding one of said plurality of on/off times read from said memory, said device control signals directing the activation or de-activation of a corresponding one of said plurality of mechanical devices;
 means for varying selected ones of said plurality of on/off times for a selected one of said plurality of mechanical devices response to input by the machine operator, said means for varying including;
  means for determining new on/off times based upon the operator input;
  means for testing whether movement of said selected one of said plurality of mechanical devices in accordance with said new on/off times can result in an interference with the movement of another of said plurality of mechanical devices, and for generating a blocking signal if such interference is detected; and
  means for replacing in memory the stored on/off times with said new on/off times for said selected one of said plurality of mechanical devices unless said blocking signal has been generated.

5. The glassware forming system of claim 4, wherein said means for testing includes:

means for defining a blocking pulse for said another of said plurality of mechanical devices, said blocking pulse representing a time range defined between two time values input by the operator;

means for comparing one of said new on/off times with said blocking pulse; and means for generating said blocking signal if said one of said new on/off times falls within said time range represented by said blocking pulse.

6. The glassware forming system of claim 4, wherein said means for testing includes:

means for defining a blocking pulse for said selected one of said plurality of mechanical devices, said blocking pulse representing a time range defined between two time values input by the operator;

means for shifting said blocking pulse by a time increment equal to the difference between said stored on/off times and said new on/off times for said selected one of said plurality of mechanical devices;

means for comparing the stored on/off times for said another of said plurality of mechanical devices with said shifted blocking pulse for said selected one of said devices; and generating said blocking signal if said stored on/off times for said another of said plurality of mechanical devices falls within said time range represented by said blocking pulse.

7. The glassware forming machine of claim 4, wherein said means for testing includes:

means for storing in memory a table listing a number of said mechanical devices;

means for associating said table with said selected one of said plurality of mechanical devices;

means for reading said table associated with said selected one of said plurality of mechanical devices to determine which of said plurality of mechanical devices is to be tested for said interference.

8. A glassware forming system comprising:

at least one glassware forming machine having a plurality of individual sections, each section having a plurality of movable mechanical devices actuatable to operate in synchronization through a cycle of operation of the glassware forming machine to form glassware articles;

a gob feeder for providing molten glass to each section of said glassware forming machine;

a plurality of device controllers for controlling the actuation of a corresponding one of said plurality of mechanical devices;

a computer-based system controller including;

means for storing in a memory data associated with each of said plurality of mechanical devices, said data for each one of said devices including;

on/off times for controlling the movement of each of said plurality of mechanical devices; and a collision list identifying others of said plurality of mechanical devices to be tested for interference in movement with said one of said devices;

means for cyclically transmitting device control signals to each of said plurality of device controllers in response to a corresponding one of said plurality of on/off times read from said memory, said device control signals directing the activation or de-activation of a corresponding one of said plurality of mechanical devices;

means for varying selected ones of said plurality of on/off times for a selected one of said plurality of mechanical devices in response to input by the machine operator, said means for varying including;

means for determining new on/off times based upon the operator input;

means for testing whether movement of said selected one of said plurality of mechanical devices in accordance with said now on/off times can result in an interference with the movement of others of said plurality of mechanical devices identified in said collision list, and for generating a blocking signal if such interference is detected; and means for replacing in memory the stored on/off times with said new on/off times for said selected one of said plurality of mechanical devices unless said blocking signal has been generated.

9. The glassware forming system of claim 8, wherein:

said data for each one of said plurality of mechanical devices further includes two time values defining a blocking pulse time range; and said means for testing includes:

means for shifting said blocking pulse by a time increment equal to the difference between said stored on/off times and said new on/off times for said selected one of said plurality of mechanical devices;

means for comparing the shifted blocking pulse of said selected one of said plurality of mechanical devices with the blocking pulses of said others of said plurality of mechanical devices; and generating said blocking signal if the blocking pulse of said selected one of said plurality of mechanical devices overlaps the blocking pulse of any of said others of said plurality of mechanical devices.

* * * * *

UNITED STATES PATENT AND TRADEMARK OFFICE
CERTIFICATE OF CORRECTION

PATENT NO. : 5,345,389
DATED : September 6, 1994
INVENTOR(S) : Rick Calvin et al.

It is certified that error appears in the above-indentified patent and that said Letters Patent is hereby corrected as shown below:

Cover Page - Abstract: Line 2, "ship" should be "shop"

Column 2, line 7: "mush" should be "must"

Column 2, line 41: "sued" should be "used"

Column 2, line 16: the word "at" after the word article should be deleted

Column 5, line 66: "preferably" should be "preferable"

Column 6, line 4: "include" should be "includes"

Column 11, line 55: "one" should be "on"

Column 14, line 27: "hob" should be "job"

Column 14, line 38: "job" should be "jog"

Column 18, line 67: "vale" should be "value"

Column 22, line 15: "now" should be "new"

Signed and Sealed this

Fourteenth Day of March, 1995

Attest:

BRUCE LEHMAN

*Attesting Officer*  *Commissioner of Patents and Trademarks*